United States Patent
Antoniv et al.

(10) Patent No.: US 11,873,353 B2
(45) Date of Patent: Jan. 16, 2024

(54) FLOW SYNTHESIS OF POLYMER NANOPARTICLES

(71) Applicant: Saudi Arabian Oil Company, Dhahran (SA)

(72) Inventors: Marta Antoniv, Cambridge, MA (US); Hooisweng Ow, Woburn, MA (US); S. Sherry Zhu, Waban, MA (US); Martin E. Poitzsch, Northumberland, NH (US)

(73) Assignee: Saudi Arabian Oil Company, Dhahran (SA)

( * ) Notice: Subject to any disclaimer, the term of this patent is extended or adjusted under 35 U.S.C. 154(b) by 828 days.

(21) Appl. No.: 16/886,850

(22) Filed: May 29, 2020

(65) Prior Publication Data

US 2020/0377626 A1    Dec. 3, 2020

Related U.S. Application Data

(60) Provisional application No. 62/854,074, filed on May 29, 2019.

(51) Int. Cl.
| | |
|---|---|
| C08F 2/01 | (2006.01) |
| C08F 220/18 | (2006.01) |
| B01J 19/00 | (2006.01) |
| B01J 19/18 | (2006.01) |
| C08F 2/22 | (2006.01) |
| C08F 212/08 | (2006.01) |
| B82Y 40/00 | (2011.01) |

(52) U.S. Cl.
CPC ............. *C08F 2/01* (2013.01); *B01J 19/0093* (2013.01); *B01J 19/18* (2013.01); *C08F 2/22* (2013.01); *C08F 212/08* (2013.01); *C08F 220/1804* (2020.02); *B01J 2219/00029* (2013.01); *B01J 2219/00033* (2013.01); *B01J 2219/0086* (2013.01); *B01J 2219/00891* (2013.01); *B01J 2219/00959* (2013.01); *B82Y 40/00* (2013.01)

(58) Field of Classification Search
CPC .. C08F 2/01; C08F 2/22; C08F 212/08; C08F 220/1804; B01J 19/0093
See application file for complete search history.

(56) References Cited

U.S. PATENT DOCUMENTS

| | | | |
|---|---|---|---|
| 4,772,563 A | 9/1988 | Evangelista et al. | |
| 5,124,268 A | 6/1992 | Dakubu | |
| 5,168,927 A | 12/1992 | Stegenmeier | |

(Continued)

FOREIGN PATENT DOCUMENTS

| | | |
|---|---|---|
| CA | 2997608 | 4/2017 |
| CN | 101475667 | 7/2009 |

(Continued)

OTHER PUBLICATIONS

PCT International Search Report and Written Opinion issued in International Application No. PCT/US2020/034820 dated Sep. 25, 2020, 18 pages.

(Continued)

*Primary Examiner* — Fred M Teskin
(74) *Attorney, Agent, or Firm* — Fish & Richardson P.C.

(57) ABSTRACT

A system and method for flow synthesis of polymer nanoparticles in a continuous flow reactor having a channel. The polymer nanoparticles are synthesized from monomer in the presence of an initiator.

31 Claims, 7 Drawing Sheets

(56) References Cited

U.S. PATENT DOCUMENTS

| | | |
|---|---|---|
| 6,250,848 B1 | 6/2001 | Moridis et al. |
| 6,252,016 B1 | 6/2001 | Wu et al. |
| 6,585,044 B2 | 7/2003 | Rester |
| 6,691,780 B2 | 2/2004 | Nguyen et al. |
| 7,032,662 B2 | 4/2006 | Malone |
| 7,033,975 B2 | 4/2006 | Baran, Jr. et al. |
| 7,289,942 B2 | 10/2007 | Yang et al. |
| 7,303,006 B2 | 12/2007 | Stone |
| 7,472,748 B2 | 1/2009 | Gdanski et al. |
| 8,148,477 B2 | 4/2012 | Saita et al. |
| 8,176,981 B2 | 5/2012 | Savu et al. |
| 8,187,554 B2 | 5/2012 | Panagiotou |
| 8,269,501 B2 | 9/2012 | Schmidt et al. |
| 8,418,759 B2 | 4/2013 | Moore et al. |
| 8,627,902 B2 | 1/2014 | Hammer |
| 8,629,089 B2 | 1/2014 | Dams |
| 8,638,104 B2 | 1/2014 | Barber et al. |
| 8,877,954 B2 | 11/2014 | Giesenberg et al. |
| 9,023,966 B2 | 5/2015 | Zhang et al. |
| 9,050,655 B2 | 6/2015 | Chou et al. |
| 9,080,097 B2 | 7/2015 | Gupta et al. |
| 9,121,271 B2 | 9/2015 | Shook |
| 9,133,709 B2 | 9/2015 | Huh et al. |
| 9,200,102 B2 | 12/2015 | Baran, Jr. et al. |
| 9,227,929 B2 | 1/2016 | Winter et al. |
| 9,296,851 B2 | 3/2016 | Luettgen |
| 9,366,099 B2 | 6/2016 | Ly |
| 9,375,790 B2 | 6/2016 | Murphy et al. |
| 9,481,764 B1 | 11/2016 | Kinlen et al. |
| 9,534,062 B2 | 1/2017 | He et al. |
| 9,592,555 B2 | 3/2017 | Schut et al. |
| 9,624,422 B2 | 4/2017 | Dams et al. |
| 9,719,009 B2 | 8/2017 | Jangda et al. |
| 9,809,740 B2 | 11/2017 | Chakraborty et al. |
| 10,273,399 B2 | 4/2019 | Cox |
| 10,308,865 B2 | 6/2019 | Cox |
| 10,308,895 B2 | 6/2019 | Vidal et al. |
| 10,421,894 B2 | 9/2019 | Johnson et al. |
| 10,487,259 B2 | 11/2019 | Cox |
| 2003/0220204 A1 | 11/2003 | Baran et al. |
| 2004/0108110 A1 | 6/2004 | Zupanick et al. |
| 2004/0143059 A1* | 7/2004 | Cabrera ............... C08F 2/22 524/800 |
| 2005/0080209 A1 | 4/2005 | Blankenship et al. |
| 2005/0252286 A1 | 11/2005 | Ibrahim et al. |
| 2006/0105052 A1 | 5/2006 | Acar et al. |
| 2007/0114030 A1 | 5/2007 | Todd et al. |
| 2009/0087911 A1 | 4/2009 | Rogerio |
| 2009/0087912 A1 | 4/2009 | Ramos et al. |
| 2009/0248309 A1 | 10/2009 | Nelville et al. |
| 2009/0253595 A1 | 10/2009 | Qu et al. |
| 2009/0277625 A1 | 11/2009 | Bai et al. |
| 2010/0049625 A1 | 2/2010 | Biebesheimer et al. |
| 2010/0270020 A1 | 10/2010 | Baran et al. |
| 2010/0307745 A1 | 12/2010 | Lafitte |
| 2011/0012331 A1 | 1/2011 | Kim |
| 2011/0030949 A1 | 2/2011 | Weaver et al. |
| 2011/0129424 A1 | 6/2011 | Berkland et al. |
| 2011/0239754 A1 | 10/2011 | Dyer |
| 2011/0320128 A1 | 12/2011 | Shook |
| 2012/0062886 A1 | 3/2012 | Piotti et al. |
| 2012/0115128 A1 | 5/2012 | Miller |
| 2012/0135080 A1 | 5/2012 | Bromberg et al. |
| 2012/0175120 A1 | 7/2012 | Holcomb et al. |
| 2012/0193578 A1 | 8/2012 | Pan et al. |
| 2012/0261617 A1 | 10/2012 | Pan et al. |
| 2012/0325465 A1 | 12/2012 | Hammer et al. |
| 2013/0084643 A1 | 4/2013 | Connnnarieu |
| 2013/0087020 A1 | 4/2013 | Brutchey et al. |
| 2013/0087329 A1 | 4/2013 | Hewitt |
| 2013/0087340 A1 | 4/2013 | Choens et al. |
| 2013/0109261 A1 | 5/2013 | Koene |
| 2013/0244914 A1 | 9/2013 | Wu et al. |
| 2013/0296453 A1 | 11/2013 | Giesenberg et al. |
| 2013/0312970 A1 | 11/2013 | Lafitte et al. |
| 2013/0341030 A1 | 12/2013 | Brannon et al. |
| 2014/0060832 A1 | 3/2014 | Mahoney et al. |
| 2014/0190700 A1 | 7/2014 | Tang et al. |
| 2014/0231077 A1 | 8/2014 | Rivero et al. |
| 2014/0260694 A1 | 9/2014 | Szlendak |
| 2014/0323363 A1 | 10/2014 | Perriat |
| 2015/0013983 A1 | 1/2015 | Alwattari |
| 2015/0050741 A1 | 2/2015 | Tour et al. |
| 2015/0118501 A1 | 4/2015 | Lu |
| 2015/0132543 A1 | 5/2015 | Nouzille et al. |
| 2015/0159079 A1 | 6/2015 | Huh et al. |
| 2015/0268370 A1 | 9/2015 | Johnston et al. |
| 2015/0368547 A1 | 12/2015 | Lesko et al. |
| 2015/0376493 A1 | 12/2015 | Huh et al. |
| 2016/0003040 A1 | 1/2016 | Jessheim et al. |
| 2016/0040514 A1 | 2/2016 | Rahmani et al. |
| 2016/0061020 A1 | 3/2016 | Sayarpour |
| 2016/0083641 A1 | 3/2016 | Gamage |
| 2016/0097750 A1 | 4/2016 | Van Herzen |
| 2016/0264846 A1 | 9/2016 | Bennetzen et al. |
| 2017/0199124 A1 | 7/2017 | Bolduc et al. |
| 2018/0275114 A1 | 9/2018 | Kosynkin |
| 2019/0368336 A1 | 12/2019 | Hammond et al. |
| 2020/0116019 A1 | 4/2020 | Ow et al. |

FOREIGN PATENT DOCUMENTS

| | | |
|---|---|---|
| CN | 102649831 | 8/2012 |
| CN | 103275270 | 9/2013 |
| CN | 107915802 | 4/2018 |
| EP | 1721603 | 11/2006 |
| EP | 2480625 | 4/2013 |
| EP | 2480626 | 4/2013 |
| GB | 2489714 | 10/2012 |
| WO | WO 2004095259 | 11/2004 |
| WO | WO 2010138914 | 12/2010 |
| WO | WO 2011035294 | 3/2011 |
| WO | WO 2011063023 | 5/2011 |
| WO | WO 2011035292 | 10/2011 |
| WO | WO 2012052148 | 4/2012 |
| WO | WO 2012154332 | 11/2012 |
| WO | WO 2012158478 | 11/2012 |
| WO | WO 2013142869 | 9/2013 |
| WO | WO 2014066793 | 5/2014 |
| WO | WO 2014207075 | 12/2014 |
| WO | WO 2015044446 | 4/2015 |
| WO | WO 2015097116 | 7/2015 |
| WO | WO 2015200060 | 12/2015 |
| WO | WO 2017136641 | 8/2017 |
| WO | WO 2018085504 | 5/2018 |
| WO | WO 2018234431 | 12/2018 |

OTHER PUBLICATIONS

PCT Invitation to Pay Additional Fees and, Where Applicable, Protest Fee issued in International Application No. PCT/US2020/034820 dated Jul. 24, 2020, 13 pages.

Agenet et al., "Fluorescent Nanobeads: a First Step Toward Intelligent Water Tracers," Society of Petroleum Engineers, presented at the SPE International Oilfield Nanotechnology Conference held in Noordwijk, the Netherlands, Jun. 12-14, 2012, 13 pages.

Alfazazi et al., "Screening of New HPAM Base Polymers for Applications in High Temperature and High Salinity Carbonate Reservoirs," SPE-192805-MS, presented at Abu Dhabi International Petroleum Exhibition & Conference, Society of Petroleum Engineers, Nov. 2018, 17 pages.

Allard and Larpent, "Core-shell type dually fluorescent polymer nanoparticles for ratiometric pH-sensing," J. Polym. Sci., Part A: Polym. Chem. 46(18): 6206-6213, 2008, 8 pages.

Al-Muntasheri et al., "Nanoparticle-Enhanced Hydraulic-Fracturing Fluids: A Review," SPE185161-PA, Society of Petroleum Engineers, SPE Production & Operations 32:02, May 2017, 10 pages.

Anisimov, "SPE 118862: The Use of Tracers for Reservoir Characterization," Society of petroleum Engineers (SPE), presented at SPE Middle East Oil and Gas Show and Conference, Mar. 15-18, 2009, 8 pages.

(56) References Cited

OTHER PUBLICATIONS

Armelao et al., "Design of luminescent lanthanide complexes: From molecules to highly efficient photo-emitting materials," Coordination Chemistry Reviews, vol. 254, Mar. 2010, 19 pages.
Aslan et al., "Fluorescent Core-Shell AG@SiO$_2$ Nanocomposites for Metal-Enhanced Fluorescence and Single Nanoparticle Sensing Platforms," Jan. 19, 2007, 2 pages.
Badgett et al., "Totalsynthese eines Neobetanidin-Derivates und des Neobetenamins," Helvetica Chimica Acta, 1970, 53(2): 433-448, English Summary.
Bagaria et al., "Iron Oxide Nanoparticles Grafted with Sulfonated Copolymers are Stable in Concentrated Brine at Elevated Temperatures and Weakly Adsorb on Silica," ACS Applied Materials & Interfaces, vol. 5, No. 8 (3329-3339), Mar. 25, 2013, 11 pages.
Bala et al., "Interaction of Different Metal Ions with Carboxylic Acid Group: A Quantitative Study," The Journal of Physical Chemistry A, vol. 111, No. 28 (6183-6190), Jun. 2007, 8 pages.
Bao et al., "Luminescence properties of the co-luminescence groups of Sm-La-pyridyl carboxylic acids," Journal of Rare Earths, 30(4), 320-324, Apr. 2012, 5 pages.
Behnke et al., "Encapsulation of Hydrophobic Dyes in Polystyrene Micro- and Nanoparticles via Swelling Procedures." J. Fluoresc. 21(3): 937-944, 2011, 8 pages.
Borrini et al., "Water Soluble PDCA Derivatives for Selective Ln(III)/An(III) and Am(III)/Cm(III) Separation," Solvent Extraction and Ion Exchange, 33(3), 224-235, Oct. 2014, 30 pages.
Brichart et al., "The Use of Fluorescent Tracers for Inhibitor Concentration Monitoring Useful for Scale Inhibitor," International Petroleum Technology Conference, IPTC-17933-MS, presented at the International Petroleum Technology Conference held in Kuala Lumpur, Dec. 10-12, 2014, 8 pages.
Bunzli and Piguet, "Taking advantage of luminescent lanthanide ions," Chemical Society Reviews, vol. 34, Issue 12 (1048-1077) Sep. 2005, 30 pages.
Chang et al., "Magnetic SERS Composite Nanoparticles for Microfluidic Detection," 251st ACE National Meeting, Mar. 13-17, 2016, 1 pages.
Chen et al., "Aggregation Kinetics of Alginate-Coated Hematite Nanoparticles in Monovalent and Divalent Electrolytes," Environmental Science & Technology, vol. 40, No. 5 (1516-1523), Mar. 2006, 8 pages.
Chen et al., "Analysis of the solution conformations of T4 lysozyme by paramagnetic NMR spectroscopy," Physical Chemistry Chemical Physics (2016), 18(8), 5850-5859, 10 pages.
Chen et al., "Hydration Repulsion between Carbohydrate Surfaces Mediated by Temperature and Specific Ions," Scientific Reports, vol. 6 (1-10), Jun. 23, 2016, 10 pages.
Chen et al., "Impact of Irreversible Retention on Tracer Deployments; Constraining Novel Material Deployments," SPE 188890-MS, in SPE Abu Dhabi International Petroleum Exhibition and Conference, Society of Petroleum Engineers, Nov. 2017, 8 pages.
Chen et al., "Improved Reservoir History Matching and Production Optimization with Tracer Data," SPE 191523-MS, in SPE Annual Technical Conference and Exhibition, Society of Petroleum Engineers, Sep. 2018, 15 pages.
Chen et al., "Semicontinuous Monomer-Starved Emulsion Polymerization as a Means to Produce Nanolatexes: Analysis of Nucleation Stage," Langmuir, 29: 5650-5658, 2013, 9 pages.
Chen et al., "FITC functionalized magnetic core-shell Fe$_3$O$_4$/Ag hybrid nanoparticle for selective determination of molecular biothiols," Elsevier Ltd., Dec. 2013, 7 pages.
Chuang et al., "Ultra-sensitive in-situ detection of novel near-infrared persistent luminescent tracer nanoagents in crude oil-water mixtures," a natureresearch journal, Scientific Reports, Jun. 15, 2016, 5 pages.
Clark et al., "Water-Soluble Fluorochemical Surfactant Well Stimulation Additives," SPE9008, Society of Petroleum Engineers, Journal of Petroleum Technology, vol. 34, Issue 07, Jul. 1982, 5 pages.
Coates et al., "Enhancement of luminescence of europium(m) ions in water by use of synergistic chelation. Part 1.1 : 1 and 2 : 1 complexes," J. Chem. Soc, Perkin Trans., Jan. 1, 1996 (Jan. 1, 1996), pp. 1275-1282.
Cole et al., "Polyethylene Glycol Modified, Cross-Linked Starch-Coated Iron Oxide Nanoparticles for Enhanced Magnetic tumor Targeting," Biomaterials, vol. 32, No. 8 (2183-2193), Mar. 1, 2011, 11 pages.
Corning Incorporated, "12.10G1 Fluidic Modules Description," in 09-CD, MG1 HP Instruction Manual, 5 ed.; Corning, Ed. pp 78-79, 2016, 2 pages.
Corning, "The future flows through Corning Advanced Flow-Reactors," G1 Reactor. Corning, Ed. 2016, 3 pages.
Cox et al., "Pyrolyzable Nanoparticle Tracers for Environmental Interrogation and Monitoring," ACS Appl. Mater. Interfaces 9, 2017, 10 pages.
Cubillos et al., "SPE 174394-MS: The Value of Inter-well and Single Well Tracer Technology for De-Risking and Optimizing a CEOR Process—Caracara Field Case," Society of Petroleum Engineers (SPE), presented at EUROPEC 2015, Jun. 1-4, 2015, 19 pages.
Das et al., "Molecular Fluorescence, Phosphorescence, and Chemiluminescence Spectrometry," Analytical Chemistry, Nov. 3, 2011, 29 pages.
Deans, "SPE 7076: Using Chemical Tracers to Measure Fractional Flow and Saturation In-Situ," Society of Petroleum Engineers (SPE), presented at SPE Symposium on improved Methods of Oil Recovery, Apr. 16-17, 1978, 10 pages.
Deschamps et al., "Drilling to the Extreme: the Micro-Coring Bit Concept," IADC/SPE 115187, presented at the IADC/SPE Asia Pacific Drilling Technology Conference and Exhibition, Aug. 25-27, 2008, 12 pages.
Desmette et al., "Drilling Hard and Abrasive Rock Efficiently, or Generating Quality Cuttings? You No Longer Have to Choose . . . ," SPE 116554, Society of Petroleum Engineers, 2008 SPE Annual Technical Conference and Exhibition, Sep. 21-24, 2008, 19 pages.
Doda et al., "Investigation of Alkali Resistant Polymer for Improved Heavy Oil Recovery," SPE 165514, presented at SPE Heavy Oil Conference-Canada, Society of Petroleum Engineers, Jun. 2013, 15 pages.
Du and Guan, "Interwell tracer tests: lessons learned from past field studies," SPE 93140-MS, in SPE Asia Pacific Oil and Gas Conference and Exhibition, Society of Petroleum Engineers, Apr. 5-7, 2005, 9 pages.
Dugstad, "Chapter 6: Well-to-well tracer tests," in Petroleum Engineering Handbook, 5, pp. 651-683, 2007, 31 pages.
Edwards et al., "Extending the distance range accessed with continuous wave EPR with Gd3+ spin probes at high magnetic fields," Physical Chemistry Chemical Physics, 15(27), 11313-11326, 2013, 14 pages.
El-Aneed et al., "Mass Spectrometry, Review of the Basics: Electrospray, MALDI, and Commonly Used Mass Analyzers," Applied Spectroscopy Reviews, Mar. 16, 2009, 22 pages.
Esumi et al., "Interaction between Zwitterionic Fluorocarbon and Anionic Surfactants in Aqueous Solutions," Langmuir, 9(358-360), 1993, 3 pages.
Fernández et al., "Evaluation of Cationic Water-Soluble Polymers With Improved Thermal Stability," SPE 93003, presented at SPE International Symposium on Oilfield Chemistry, Society of Petroleum Engineers, Feb. 2005, 13 pages.
Freeze and Cherry, "Chapter 9: Groundwater Contamination," in Groundwater, Englewood Cliffs, NJ: Prentice-Hall, Inc., p. 604, 1979, 80 pages.
Gaillard et al., "New Water Soluble Anionic NVP Acrylamide Terpolymers for Use in Harsh EOR Conditions," SPE-169108-MS, presented at SPE Improved Oil Recovery Symposium, Society of Petroleum Engineers, Apr. 2014, 18 pages.
Gaillard et al., "Selection of Customized Polymers to Enhance Oil Recovery from High Temperature Reservoirs," SPE-177073-MS, presented at the SPE Latin American and Caribbean Petroleum Engineering Conference, Society of Petroleum Engineers, Nov. 2015, 15 pages.

(56) References Cited

OTHER PUBLICATIONS

Galdiga and Greibrokk, "Ultra-trace determination of flurinated aromatic carboxylic acids in aqueous reservoir fluids using solid-phase extraction in combination with gas chromatography-mass spectrometry," Journal of Chromatography, vol. 793, Issue 2, Jan. 16, 1998, 10 pages.
Gardiner et al., "Practical Raman Spectroscopy," Springer-Verlag, 1989, 9 pages.
George et al., "Modified Dipicolinic Acid Ligands for Sensitation and Europium (III) Luminescence," Inorganic Chemistry, vol. 45, No. 4, Feb. 1, 2006, 6 pages.
Georgi, et al., "Advances in Cuttings Collection and Analysis," SPWLA 34th Annual Logging Symposium, Jun. 13-16, 1993, 20 pages.
Goerke et al., "Analysis of the Transfer of Radical Co-polymerisation Systems from Semi-batch to Continuous Plants," in 12th International Symposium on Process Systems Engineering and 25th European Symposium on Computer Aided Process Engineering, Elsevier B.V, Copenhagen, Denmark, 2015, 6 pages.
Gordon-Grossman et al., "W-Band pulse EPR distance measurements in peptides using Gd3+-dipicolinic acid derivatives as spin labels," Physical Chemistry Chemical Physics, 13(22), 10771-10780, 2011, 10 pages.
Grutzke et al., "Heptacoordinate Heteroleptic Salan (ONNO) and Thiosalan (OSSO) Titanium(IV) Complexes: Investigation of Stability and Cytotoxicity," Inorganic Chemistry 54(14), 6697-6706, Jul. 2015, 10 pages.
Hagoot, "The response of interwell tracer tests in watered-out reservoirs," SPE 11131-MS, in SPE Annual Technical Conference and Exhibition, Society of Petroleum Engineers, Jan. 1982, 21 pages.
Han et al., "Application of Silver-Coated Magnetic Microspheres to a SERS-Based Optofluidic Sensor," The Journal of Physical Chemistry (JPCC), Mar. 7, 2011, 7 pages.
He et al., "Luminescent Europium Chelates Synthesis and Fluorescence Properties," Sensors and Materials (2007), 19(2), 123-132, 10 pages.
Hu et al., "Smart Liquid SERS Substrates based on $Fe_3O_4$/Au Nanoparticles with Reversibility Tunable Enhancement Factor for Practical Quantitative Detection," a nature research journal, Scientific Reports, Nov. 27, 2014, 10 pages.
Huseby et al., "Assessing EOR potential from partitioning tracer data," SPE 172808-MS, in SPE Middle East Oil and Gas Show and Conference, Society of Petroleum Engineers, Mar. 2015, 15 pages.
Huseby et al., "SPE-169183-MS: High Quality Flow Information from Tracer Data," Society of Petroleum Engineers (SPE), presented at the SPE Bergen One Day Seminar, Apr. 2, 2014, 9 pages.
Hutchins et al., "SPE-21049: Aqueous Tracers for Oilfield Applications," Society of Petroleum Engineers (SPE), presented at SPE International Symposium on Oilfield Chemistry, Feb. 20-22, 1991, 9 pages.
Jangda et al., "Evaluation of Fluorosurfactant Performance with Super-Critical CO2 Flooding for High Salinity Carbonate Reservoirs," SPE-169725-MS, presented at the SPE EOR Conference at Oil and Gas West Asia, Society of Petroleum Engineers, Mar. 2014, 14 pages.
Jenkins et al., "Ultratrace Determination of Selected Lanthanides by Luminescence Enhancement," Analytical Chemistry, vol. 68, No. 17, Jan. 1, 1996, 7 pages.
Jun et al., "Multifunctional Silver-Embedded Magnetic Nanoparticles as SERS Nanoprobes and Their Applications," Wiley-VCH Verlag GmbH& Co. KGaA, Weinheim, Jan. 4, 2010, 7 pages.
Junkers, "Precision Polymer Design in Microstructured Flow Reactors: Improved Control and First Upscale at Once," Macromol. Chem. Phys. 218: 1600421-1600421, 2016, 9 pages.
Kaushik et al., "Gd(III) and Mn(II) complexes for dynamic nuclear polarization: small molecular chelate polarizing agents and applications with site-directed spin labeling of proteins," Physical Chemistry Chemical Physics, 18(39), 27205-27218, 2016, 36 pages.

Khan et al., "Optimizing waterflood management in a giant UAE carbonate oil field using simulation-based streamlines," SPE 171777-MS, in Abu Dhabi International Petroleum Exhibition and Conference, Society of Petroleum Engineers, Nov. 10-13, 2014, 9 pages.
Kneipp et al., "Single Molecule Detection Using Surface-Enhanced Raman Scattering (SERS)," Physical Review Letters, American Physical Society vol. 78, No. 9, Mar. 3, 1997, 4 pages.
Knowles et al., "Zwitterion Functionalized Silica Nanoparticle Coatings: The Effect of Particle Size on Protein, Bacteria, and Fungal Spore Adhesion," Langmuir, 35(5): 1335-1345, 2019, 11 pages.
Kornberger and Thiele, "Experiences with an Efficient Rate-Management Approach for the 8th Tortonian Reservoir in the Vienna Basin," SPE 166393-PA, SPE Reservoir Evaluation and Engineering, vol. 17, No. 2, May 2014, 12 pages.
Kosynkin and Alaskar, "Oil Industry First Interwell Trial of Reservoir Nanoagent Tracers," SPE 181551-MS, in SPE Annual Technical Conference and Exhibition, Society of Petroleum Engineers, Sep. 2016, 15 pages.
Kramer, "Water-Soluble Dendritic Architectures with Carbohydrate Shells for the Templation and Stabilization of Catalytically Active Metal Nanoparticles," published by ACS, Macromolecules, vol. 38, No. 20 (8308-8315), Aug. 27, 2005, 8 pages.
Kulawardana et al., "Rheology and Transport of Improved EOR Polymers under Harsh Reservoir Conditions," SPE 154294, presented at the SPE Improved Oil Recovery Symposium, Society of Petroleum Engineers, Apr. 2012, 14 pages.
Labbe et al., "Development of metal-chelating inhibitors for the Class II fructose 1,6-bisphosphate (FBP) aldolase," Journal of Inorganic Biochemistry, 112, 49-58, Jul. 2012, 10 pages.
Larsen et al., "Efficient Synthesis of 4,7-Diamino Substituted 1,10-Phenanthroline-2,9-dicarboxamides," Organic Letters, vol. 13, No. 13, Jul. 1, 2011 (Jul. 1, 2011), pp. 3546-3548.
Levitt et al., "Selection and Screening of Polymers for Enhanced-Oil Recovery," SPE 113845, presented at the SPE Symposium on Improved Oil Recovery, Society of Petroleum Engineers, Apr. 2008, 18 pages.
Li et al., "Magic Angle Spinning NMR Structure Determination of Proteins from Pseudocontact Shifts," Journal of the American Chemical Society, 135(22), 8294-8303, May 2013, 10 pages.
Li et al., "Thiol-ene reaction: a versatile tool in site-specific labelling of proteins with chemically inert tags for paramagnetic NMR," Chemical Communications, Cambridge, United Kingdom, 48(21), 2704-2706, 2012, 18 pages.
Manna et al., "Complexation behavior of trivalent actinides and lanthanides with 1,10-phenanthroline-2,9-dicarboxylic acid based ligands: insight from density functional theory," Physical Chemistry Chemical Physics, vol. 14, No. 31, Jan. 1, 2012 (Jan. 1, 2012), p. 11060.
Marais et al., "Time-Resolved Fluorescence for Real-Time Monitoring of Both Scale and Corrosion Inhibitors: a Game-Changing Technique," SPE 179867, Society of Petroleum Engineers, presented at the SPE International Oilfield Scale Conference and Exhibition held in Aberdeen, Scotland, May 11-12, 2016 11 pages.
Marchetti et al., "Fluorous affinity chromatography for enrichment and determination of perfluoroalkyl substances," Annual Review of Analytical Chemistry vol. 84, Jul. 19, 2012, 8 pages.
Martinez et al., "Polysaccharide-based Nanoparticles for Controlled Release Formulations," The Delivery of Nanoparticles, (185-222), May 2012, 39 pages.
Martini et al., "How to Monitor Scale Inhibitor Squeeze using Simple TRF Tracers," Society of Petroleum Engineers, presented at the SPE International Symposium on Oilfield Chemistry held in the Woodlands, Texas, Apr. 13-15, 2015, 8 pages.
Melton et al, "Complexes of Greatly Enhanced Thermodynamic Stability and Metal Ion Size-Based Selectivity, Formed by the Highly Preorganized Non-Macrocyclic Ligand 1,10-Phenanthroline-2,9-dicarboxylic Acid: A Thermodynamic and Crystallographic Study," Inorganic Chemistry, vol. 45, No. 23, Nov. 1, 2006 (Nov. 1, 2006), pp. 9306-9314.
Miller and McQuade, "5 Synthesis of Materials I Flow—Principles and Practice," from De Gruyter et al., Flow Chemistry, vol. 2, 2014, Part II, Chapter 5, pp. 133-160, 28 pages.

(56) References Cited

OTHER PUBLICATIONS

Mohamed et al., "Reaction screening in continuous flow reactors," J. Tetrahedron Letters, 57: 3965-3977, 2016, 12 pages.
Morse et al., "Enhanced Reaction Efficiency in Continuous Flow," Isr. J. Chem, 57:218-227, Apr. 2017, 14 pages.
Moyner et al., "The Application of Flow Diagnostics for Reservoir Management," Society of Petroleum Engineers (SPE), Apr. 2015, 18 pages.
Muller and Seubert, "Ultra trace determination of fluorobenzoic acids in tap and reservoir water using solid-phase extraction and gas chromatography-mass spectrometry," Journal of Chromatography A, 1260, Oct. 2012, 7 pages.
Musyanovych et al., "Preparation of Biodegradable Polymer Nanoparticles by Miniemulsion Technique and Their Cell Interactions," Macromolecular Bioscience, vol. 8, Issue 2, Feb. 11, 2008, 13 pages.
Ogden et al., "Complexation of Am(III) and Nd(in) by 1,10-Phenanthroli ne-2,9-Di carboxylic Acid," Journal of Solution Chemistry, vol. 42, No. 1, pp. 211-225, 2013, 15 pages.
Ouali et al., "Analysis of Paramagnetic NMR Spectra of Triple-Helical Lanthanide Complexes with 2,6-Dipicolinic Acid Revisited: A New Assignment of Structural Changes and Crystal-Field Effects 25 Years Later," Inorganic Chemistry, 41(6), 1436-1445, Feb. 2002, 10 pages.
Parker and Williams, "Getting excited about lanthanide complexation chemistry," Journal of the Chemical Society, Dalton Transactions, vol. 18, 1996, 16 pages.
Parker et al., "Being excited by lanthanide coordination complexes: aqua species, chirality, excited-state chemistry, and exchange dynamics," Chemical Reviews, vol. 102, Issue 6, May 2002, 34 pages.
Petoud et al., "Brilliant SM, Eu, Tb, and Dy Chiral Lanthanide Complexes with Strong Circularly Polarized Luminescence," Journal fo the American Chemical Society (JACS), Dec. 15, 2006, 7 pages.
Potapov et al., "Nanometer-Scale Distance Measurements in Proteins Using Gd3+ Spin Labeling," Journal of the American Chemical Society, 132(26), 9040-9048, Jun. 2010, 9 pages.
Qianming et al., "Bspda Synthesis and its Europium (III) Complexes' Fluorescence," Chemical Industry Times, Jul. 2005, 19(7): 38-41, English Abstract.
Quadri et al., "Screening of Polymers for EOR in High Temperature, High Salinity and Carbonate Reservoir Conditions," IPTC-18436-MS, presented at the International Petroleum Technology Conference, Dec. 2015, 30 pages.
Reisch and Klymchenko, "Fluorescent Polymer Nanoparticles Based on Dyes: Seeking Brighter Tools for Bioimaging." Small 12(15): 1968-1992 2016, 48 pages.
Rowan et al., "Dynamic Covalent Chemistry," Angewante Chemie International Edition, Mar. 15, 2002, 55 pages.
Sabbatini et al., "Luminescent lanthanide complexes as photochemical supramolecular devices," Coordination Chemistry Reviews, vol. 123, issue 1-2, Feb. 1993, 28 pages.
Sabhapondit et al., "Water Soluble Acrylamidomethyl Propane Sulfonate (AMPS) Copolymer as an Enhanced Oil Recovery Chemical," Energy & Fuels, 17:683-688, 2003, 6 pages.
Saeki et al., "Upper and lower critical solution temperatures in poly (ethylene glycol) solutions," Polymer, vol. 17, No. 8, (685-689), Aug. 1976, 5 pages.
Sajjadi, "Nanoparticles Formation by Monomer-Starved Semibatch Emulsion Polymerization," Langmuir, 23(1018-1024), 2007, 7 pages.
Sajjadi, "Particle Formation under Monomer-Starved Conditions in the Semibatch Emulsion Polymerization of Styrene. I. Experimental.," Journal of Polymer Science: Part A: Polymer Chemistry, 39: 3940-3952, 2001, 13 pages.
Sammes and Yshioglu, "Modern bioassays using metal chelates as luminescent probes," Natural Product Reports, vol. 31, No. 1, 1996, 28 pages.
Sanni et al., "A field case study of inter-well chemical tracer test," in SPE International Symposium on Oilfield Chemistry, Society of Petroleum Engineers, Apr. 2015, 17 pages.

Sanni et al., "Pushing the envelope of residual oil measurement: A field case study of a new class of inter-well chemical tracers," Journal of Petroleum Science and Engineering, vol. 163, 2018, 19 pages.
Santarelli et al., "Formation Evaluation From Logging on Cuttings," SPE Reservoir Evaluation and Engineering, presented at the 1996 SPE Permian Basin Oil and Gas Recovery Conference, Mar. 27-29, 1996, published Jun. 1998, 7 pages.
Schmidt et al., "Copper dipicolinates as peptidomimetic ligands for the Src SH2 domain," Bioorganic & Medicinal Chemistry Letters, 14(16), 4203-4206, Aug. 2004, 4 pages.
Schmidt et al., "Synthesis of Mono- and Dinuclear Vanadium Complexes and Their Reactivity toward Dehydroperoxidation of Alkyl Hydroperoxides," Inorganic Chemistry 56(3), 1319-1332, 2017, 14 pages.
Selvin et al., "Principles and biophysical applications of lanthanide-based probes," Annual Review of Biophysics and Biomolecular Structure, Jun. 2002, 28 pages.
Serres-Piole et al., "Direct sensitive simultaneous determination of fluorinated benzoic acids in oil reservoir waters by ultra high-performance liquid chromatography-tandem mass spectrometry," Journal of Chromatography A, 1218, Aug. 2011, 6 pages.
Serres-Piole et al., "Water tracers in oilfield applications: Guidelines," Elsevier Ltd., Journal of Science and Engineering, Nov. 2012, 18 pages.
Shamsijazeyi et al., "Polymer-Coated Nanoparticles for Enhance Oil Recovery," Journal of Applied Polymer Science, vol. 131, No. 15, Aug. 5, 2014, 13 pages.
Shook et al., "SPE 124614: Determining Reservoir Properties and Flood Performance from Tracer Test Analysis," Society of petroleum Engineers (SPE), presented at SPE Annual Technical Conference and Exhibition, Oct. 4-7, 2009, 19 pages.
Song et al., "SERS-Encoded Nanogapped Plasmonic Nanoparticles: Growth of Metallic Nanoshell by Templating Redox-Active Polymer Brushes," Journal of the American Chemical Society (JACS), Apr. 28, 2014, 4 pages.
Stiles et al., "Surface-enhanced Raman Spectroscopy," Annual Review of Analytical Chemistry, Mar. 18, 2008, 29 pages.
Stryer et al., "Diffusion-enhanced fluorescence energy transfer," Annual Review of Biophysics and bioengineering, vol. 11, Issue 1, 1982, 21 pages.
Su et al., "A Dipicolinic Acid Tag for Rigid Lanthanide Tagging of Proteins and Paramagnetic NMR Spectroscopy," Journal of the American Chemical Society, 130(32), 10486-10487, Jul. 2008, 2 pages.
Tang et al., "Synthesis and fluorescence properties of Tb(III) complexes with pyridine-2,6-dicarboxylic acid derivatives," Journal of Central South University of Technology (English Edition), 15(5), 599-605, Oct. 2008. 7 pages.
Tang et al., "Synthesis of Novel Derivatives of Pyridine-2,6-dicarboxylic Acid," Synthetic Communications: An International Journal for Rapid Communication of Synthetic Organic Chemistry, 36(14), 2027-2034, Jun. 2006, 9 pages.
Tang et al., "Synthesis of Eu(III) and Tb(III) Complexes with Novel Pyridine-2,6-Dicarboxylic Acid Derivatives and Their Fluorescence Properties," Front. Chem. China, 2006, 4: 408-413.
Taylor et al., "Water-Soluble Hydrophobically Associating Polymers for Improved Oil Recovery: A Literature Review," SPE 29008, Journal of Petroleum Science and Engineering, vol. 19, Issue 3-4 (265-280), Mar. 1998, 16 pages.
Tian et al., "Off-Resonant Gold Superstructures as Ultrabright Minimally Invasive Surface-Enhanced Raman Scattering (SERS) Probes," American Chemical Society, Jul. 2015, 7 pages.
Toulhoat, "Experimentation and Modelling of U, Th and Lanthanides Transport in Fissured Rocks: Influence of Complexation," MRS Proceedings, vol. 50, Jan. 1, 1985, 8 pages.
Vaccaro et al., " Flow Approaches Towards Sustainability," Green Chem, 16:3680-3704, 2014, 25 pages.
Vermolen et al., "Pushing the Envelope for Polymer Flooding Towards High-temperature and High-salinity Reservoirs with Polyacrylamide Based Terpolymers," SPE 141497, presented at SPE Middle East Oil and Gas Show and Conference, Society of Petroleum Engineers, Mar. 2011, 9 pages.

(56) References Cited

OTHER PUBLICATIONS

Vollrath et al., "Fluorescence imaging of cancer tissue based on metal-free polymeric nanoparticles—a review." J. Mater. Chem. B 1(15): 1994-2007, 2013, 15 pages.

Wang et al., "The Design and Implementation of a Full Field Inter-Well Tracer Program on a Giant UAE Carbonate Oil Field," in Abu Dhabi International Petroleum Exhibition and Conference, Society of Petroleum Engineers, SPE-177527-MS, Nov. 2015, 8 pages.

Wever et al., "Polymers for enhanced oil recovery: A paradigm for structure-property relationship in aqueous solution," Progress in Polymer Science, 2011. 36:11 (1558-1628), Nov. 2011, 71 pages.

Wu et al., "Development of New Polymers with Better Performance under Conditions of High Temperature and High Salinity," SPE 155653, SPE EOR Conference at Oil and Gas, Society of Petroleum Engineers, Apr. 16-18, 2012, 11 pages.

Wu et al., "A reusable biosensor chip for SERS-fluorescence dual mode immunoassay," Proc. SPIE 9543, Third International Symposium on Laser Interaction with Matter, 954317, May 4, 2015, 6 pages.

Wu et al., "A SERS-Assisted 3D Barcode Chip for High-Throughput Biosensing," Small Journal vol. 11, No. 23, Jun. 11, 2015, 9 pages.

Xu et al.., "Measurement of two-photon excitation cross sections of molecular fluorophores with data from 690 to 1050 nm," Journal of the Optical Society of America B, Mar. 1996, 11 pages.

Yang et al., "The Co-Luminescence Groups of Sm-La-pyridyl Carboxylic Acids and the Binding Characteristics between the Selected Doped Complex and Bovine Serum Albumin," Bulletin of the Korean Chemical Society 33(4), 1303-1309, Apr. 20, 2012, 7 pages.

Yang et al., "Paramagnetic labeling of proteins and pseudocontact shift in structural biology," Chinese Journal of Magnetic Resonance, 2014, 31(2):155-171, English Abstract.

Ye et al., "Synthesis and Characterization of a Water-Soluble Sulfonates Copolymer of Acrylamide and N-Allylbenzamide as Enhanced Oil Recovery Chemical," Journal of Applied Polymer Science, vol. 128, Issue 3, (2003-2011), May 5, 2013, 9 pages.

Zamberi et al., "SPE 166005: Improved Reservoir Surveillance Through Injected Tracers in a Saudi Arabian Field: Case Study," Society of Petroleum Engineers (SPE), presented at SPE Reservoir Characterization and Simulation Conference and Exhibition, Sep. 16-18, 2013, 15 pages.

Zemel, "Chapter 3: Tracers in the Oil Field," in Tracers in the Oil Field, Technology and Engineering, Elsevier, vol. 43, Jan. 1995, 47 pages.

Zhang et al., "Effect of Concentration on HPAM Retention in Porous Media," SPE-166265-PA, presented as SPE Annual Technical Conference and Exhibition, Society of Petroleum Engineers, (373-380), Sep. 30-Oct. 2, 2013, 11 pages.

Zhao et al., "Chromatographic Separation of Highly Soluble Diamond Nanoparticles Prepared by Polyglycerol Grafting," Angewandte Chemie International Edition, vol. 50, No. 6 (1388-1392), Feb. 7, 2011, 5 pages.

Zhou et al., "Upconversion luminescent materials: advances and applications," Chem Rev., Jan. 14, 2015, 71 pages.

EP Communication Pursuant to Article 94(3) EPC in European Appln. No. 20733675.1-1102, dated Jan. 27, 2023, 3 pages.

GCC Examination Report in Gulf Cooperation Council Appln. No. GC 2020-39840, dated Aug. 7, 2021, 5 pages.

\* cited by examiner

FLOW SYNTHESIS OF POLYMER NANOPARTICLES

CROSS-REFERENCE TO RELATED APPLICATION

This application claims the benefit of priority to U.S. Provisional Patent Application Ser. No. 62/854,074, filed May 29, 2019, the contents of which are hereby incorporated by reference herein.

TECHNICAL FIELD

This disclosure relates to polymer particles.

BACKGROUND

Polymeric nanoparticles (polymer NP or PNP) are solid particles having a size, for example, in the range of 10 nanometers (nm) to 1000 nm. More typically, the size of polymer nanoparticles is in the range of 10 nm to 100 nm. This size of less than 100 nm may facilitate penetration of the nanoparticles in applications. Also, the ratio of surface area to volume of nanoparticles may benefit applications that rely on reactions on the surface of particles. Polymer nanoparticles may have applications such as drug delivery systems, photonics, sensors, conducting materials, catalysts, agriculture, and pollution control. Polymer nanoparticles are typically prepared in a batch synthesis. The choice of the batch preparation technique may depend on factors such as particle size, particle size distribution, solvent types, and area of application.

SUMMARY

An aspect relates to a method of flow synthesis of polymer nanoparticles. The method includes feeding a mixture having a radical initiator to a continuous flow reactor having a channel, and heating the mixture in a preheating section of the continuous flow reactor. The method includes feeding monomer to the continuous flow reactor, and mixing the monomer with the mixture in a reaction section of the continuous flow reactor downstream of the preheating section. The method includes polymerizing the monomer in the presence of the radical initiator in the reaction section to form polymer nanoparticles, wherein the polymerizing of the monomer includes emulsion polymerization. The method includes discharging polymer nanoparticles from the continuous flow reactor.

Another aspect relates to a method of flow synthesis of polymer nanoparticles, including preheating a mixture having a radical initiator in a continuous flow reactor having a flow channel. The method includes polymerizing monomer having methacrylate units in presence of the initiator via an emulsion polymerization in the continuous flow reactor to form polymer nanoparticles that include polymer of the methacrylate units. The method includes discharging the polymer nanoparticles from the continuous flow reactor.

Yet another aspect relates to a method of flow synthesis of polymer nanoparticles. The method includes flowing a first mixture having a radical initiator and water to a continuous flow reactor having a flow channel for reactant flow. The method includes flowing monomer to the continuous flow reactor. The method includes forming in the continuous flow reactor a second mixture having the first mixture and the monomer. The method includes polymerizing, via emulsion polymerization, the monomer in the second mixture in the continuous flow reactor to form polymer nanoparticles.

Yet another aspect relates to a continuous flow reactor system having a continuous flow reactor having a flow channel. The continuous flow reactor system includes a first source to supply a mixture to a continuous flow reactor. The mixture includes a radical initiator and water. The continuous flow reactor system includes a second source to supply monomer to the continuous flow reactor. The continuous flow reactor has a mixing section to mix the monomer with the mixture to form a polymerization mixture for emulsion polymerization. The continuous flow reactor has a reaction section to polymerize the monomer in the polymerization mixture via emulsion polymerization to form polymer nanoparticles.

The details of one or more implementations are set forth in the accompanying drawings and the description to be presented. Other features and advantages will be apparent from the description and drawings, and from the claims.

DETAILED DESCRIPTION

Figure 1:
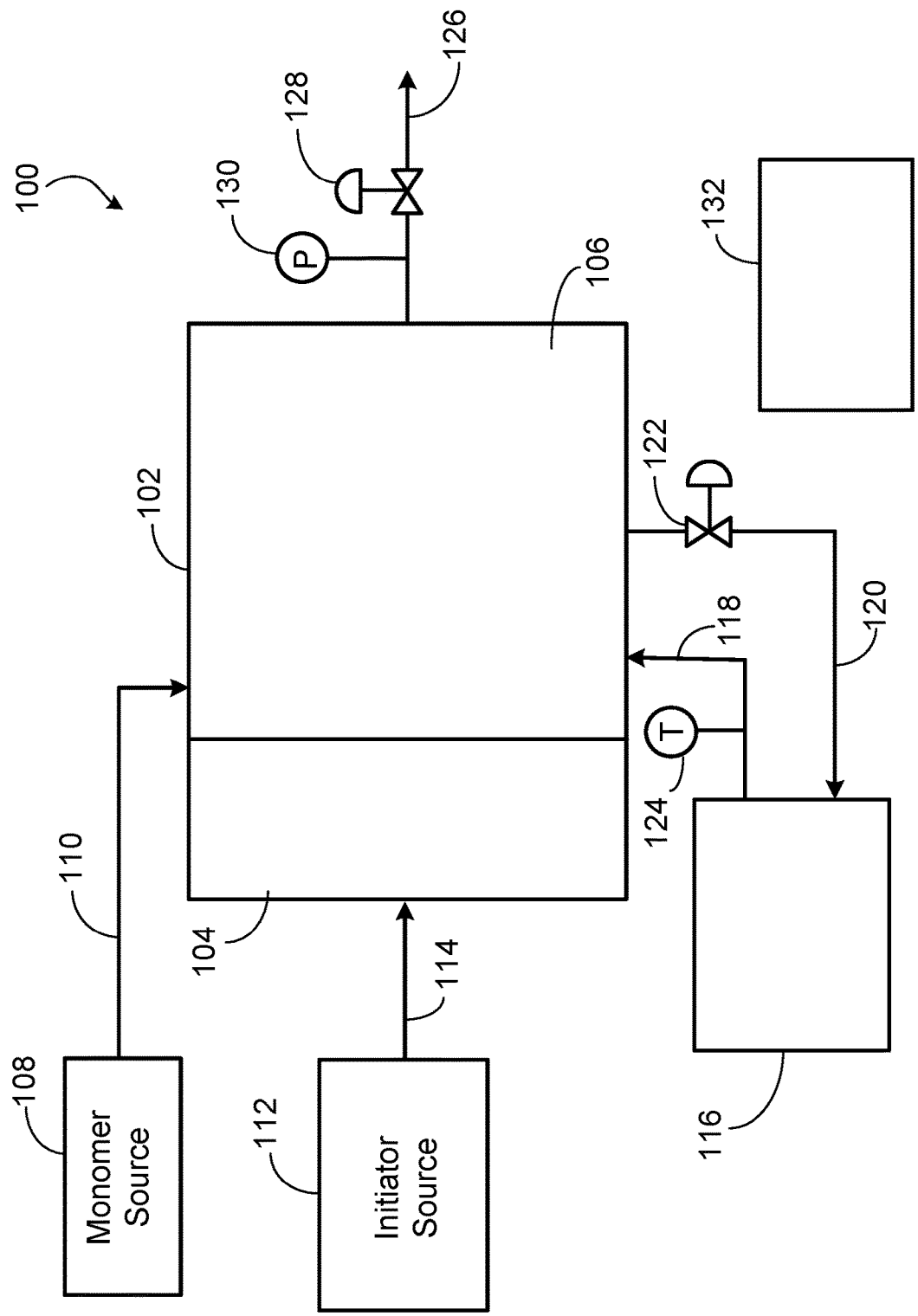
FIG. 1 is a diagram of a continuous flow reactor system for synthesizing polymer nanoparticles.

Some aspects of the present disclosure are directed to synthesizing polymer nanoparticles utilizing a continuous flow reactor having a channel. Flow chemistry may be flow synthesis in a continuous flow reactor. Batch chemistry has traditionally been employed for polymerization of nanoparticles and microparticles due to the simplicity of batch synthesis. However, flow chemistry may provide advantages for reaction processes in the synthesis of polymer particles. Flow chemistry can give improvements in the synthesis, catalysis, reaction screening, scale-up, and quality control. Continuous flow reactors can achieve greater yields, faster production, and more uniform particle size or narrower particle size distribution than in batch production.

Batch synthesis has drawbacks for reactions that are sensitive to mixing and heating where heat transfer is an issue. Batch stirring or batch agitating forms gradients of temperature in the reaction solution. In reactions such as polymer syntheses, these temperature irregularities impact chain growth because the temperature gradients cause variability in the reaction speed among volume regions in the polymerization solution. This variability can be problematic in the laboratory or pilot plant and at industrial scale. Scale-up of batch reactions with the temperature gradients can increase irregularity in particle size distribution of the polymer. Thus, the quality of batch products may suffer where uniform particles or narrow particle size distribution (PSD) is desired.

In comparison to batch synthesis, flow synthesis may achieve more uniform heat distribution and more efficient heat transfer in polymerization reactions. In continuous flow reactors, the degree of mixing can be controlled by flow rates of the reactants. Increasing flow rates through the continuous flow reactor can achieve more uniform mixing of the reactants than in batch synthesis. The more uniform mixing may decrease the dispersity or polydispersity index (PDI) of the polymer nanoparticles. The reproducibility of conditions in flow synthesis facilitates consistent production of monodisperse materials.

Flow chemistry may improve the quality of syntheses by increasing the yield of reactions. This increase in yield may occur through the greater heat-transfer surface area to volume ratio in flow reactors (compared to batch reactors), increased mixing by increasing reactant flow rate, and better selectivity in some reactions. As for selectivity, flow implementation with a back pressure regulator (discussed later) may give better product selectivity than typical batch synthesis. This is because the flow reaction can be performed at increased pressure and therefore at temperatures greater than the atmospheric boiling point of the reagents. The back pressure regulator facilitates increase of the reaction pressure to allow for increase in polymerization temperature. For some reactions, increased temperature kinetically favors the product over a byproduct and thus gives better selectivity. Flow syntheses with continuous flow reactors may facilitate a range of reaction pressures by employing back pressure regulators. Continuous flow reactors may provide ease of varying pressure via the back-pressure regulator.

Continuous flow reactors may provide ease of varying temperature via the greater heat-transfer area to volume ratio than in batch reactors while facilitating a greater production rate of product as compared to batch synthesis. In flow synthesis, the flow reactor may react multiple times (for example, ten times or 10×) the amount of material in the same time period as a corresponding-size batch process. Flow reactors give the capability to scale-up lab processes and produce kilograms of material in a few hours at pilot scale or commercial scale.

Nanomaterials have been primarily synthesized in batch mode in quantities less than one kilogram in the laboratory. Due to the inherently difficult reproducibility of size, distribution, and quality from batch to batch, there are challenges in scaling batch procedures up to the quantities of nanomaterials relevant for realization in industries such as the oil and gas industry. Conversely, present embodiments scale-up the synthesis of polymeric nanoparticles with flow synthesis via, for example, increasing the number of modules of a flow reactor. This technique for nanoparticle synthesis is demonstrated in the Examples presented later. The Examples show scale up of nanoparticle synthesis that yielded monodispersed polymer nanoparticles at sub-50 nanometer (nm) particle size with only 10 weight percent of the amount of initiator used in a corresponding batch process. This continuous-flow nanoparticle synthesis was achieved at a faster rate than the batch synthesis. In application in the oil and gas industry, the synthesized polymer nanoparticles can be used as interwell or near-wellbore tracers and as tags for mud logging operations.

FIG. 1 is a continuous flow reactor system 100 for synthesizing polymer nanoparticles. The system 100 polymerizes monomer into the polymer nanoparticles. The polymer nanoparticles may have an average or median particle size less than 200 nm, less than 100 nm, or less than 50 nm. In some implementations, the polymer nanoparticles are monodisperse or near-monodisperse (for example, at least 90% monodisperse). Monodisperse (or uniform) polymer nanoparticles may mean the particle distribution is particles having approximately the same size or a size variation of less than 5% (or less than 10%). Monodisperse polymer nanoparticles may be polymer nanoparticles composed of molecules of approximately the same mass. Monodisperse may mean a polydispersity index (PDI) less than 0.02. Near-monodisperse may mean a PDI of less than 0.08.

In implementations, the polymerization is an emulsion polymerization. Emulsion polymerization may be a type of radical polymerization that typically starts with an emulsion incorporating water, monomer, and surfactant. A type of emulsion polymerization is monomer-in-water emulsion, in which droplets of monomer are emulsified via surfactant in a continuous phase of water. Water-soluble polymers can also be utilized as an emulsifier or stabilizer. While an emulsion is formed (e.g., typically via a surfactant) for the polymerization, the polymerization may occur not in emulsion droplets but in formed colloid particles made of polymer chains. The surfactant may prevent coagulation of the colloid particles. The surfactant is generally present in the slurry of product polymer nanoparticles and water that discharge from the continuous flow reactor. An advantage of emulsion polymerization may that be high molecular weight polymers can be made at fast polymerization rates. In contrast, for bulk and solution free-radical polymerization, a tradeoff exists between molecular weight and polymerization rate.

In certain implementations, a surfactant is required to facilitate emulsion formation for the emulsion polymerization. Moreover, for implementations, the polymerization is not a bulk radical polymerization. Instead, with embodiments of the present polymerization, at least the major monomer (e.g., styrenic monomers or acrylic monomers) is not soluble in the solvent (water). Instead, the main monomer is dispersed in water to from an emulsion stabilized by a surfactant or by a water soluble comonomer. Further, the polymer nanoparticles formed are not soluble in the solvent (water). Instead, the resulting polymer (e.g., copolymer) is dispersed (not dissolved) as nanoparticles in water forming a colloidal system.

The monomer may be an acrylate monomer and the polymer nanoparticles are acrylate polymers. The monomer may be styrene or styrene-based (styrenic derivative) and the polymer nanoparticles are styrenic polymer such as polystyrene. In some embodiments, the operating conditions of the polymerization may include a pressure in a range of 0 pounds per square inch gauge (psig) to 260 psig and a polymerization temperature in a range of 120° F. to 250° F.

In certain embodiments, the sequence of monomer addition includes a water-soluble minor monomer (comonomer) fed with the initiator in water to the continuous flow reactor. The water-soluble comonomer may be, for example, an acrylamide monomer. The reaction starts with the water-soluble comonomer. The major monomer (e.g., acrylate monomer or styrenic monomer) is fed to the continuous flow reactor to be mixed with the mixture of initiator, water, water-soluble comonomer in which reaction has already begun. Water-stable nanoparticles of copolymer are formed. This monomer addition sequence may be beneficial in resulting in more hydrophilic acrylamide on the surface of the copolymer nanoparticles. This monomer addition sequence may facilitate that the emulsion radical polymerization can be surfactant-free. The feeding of the water-soluble comonomer with the initiator and the downstream addition of the major monomer can give surfactant-free emulsion radical polymerization in some embodiments.

The continuous flow reactor system 100 includes a continuous flow reactor 102 having a flow channel(s) (fluid channel) for the reactant (monomer) in the reaction (polymerization). The flow channel may promote mixing of the reactants or mixture flowing through the channel. The geometry of the flow channel may promote mixing. The continuous flow reactor 102 may have one or more flow layers or paths adjacent the flow channel to route a heat transfer medium (fluid) for temperature control of the reaction.

The flow channel (flow passage) of the continuous flow reactor 102 for the monomer and the polymerization may have a width or hydraulic diameter greater than 1 millimeter (mm). In certain implementations, the channel is a microchannel having a width or hydraulic diameter less than 1 mm. In some embodiments, the continuous flow reactor 102 is a microreactor which may be labeled as a microstructured reactor, microchannel reactor, or microfluidic reactor. The size of the continuous flow reactor 102 and other equipment in the continuous flow reactor system 100 may depend on the production scale and the kinetics of the polymerization.

The continuous flow reactor 102 is a continuous operation as opposed to a batch operation. In some implementations, the continuous flow reactor 102 may be incorporated in a semi-batch reactor system. The overall system 100 associated with the continuous flow reactor 102 may have batch or semi-batch operations.

The flow passage through the interior of a flow channel for the reaction mixture may be labeled as the process side of the channel. This process side of the channel(s) is the passage through the channel in which the reaction (polymerization) mixture flows. In contrast, the flow layer or path adjacent to the flow channel that may route a heat transfer medium (fluid) for temperature control of the reaction can be labeled as the utility side of the flow channel. The reactor 102 or flow channel may have this utility side that is an external side or layer outside of the reaction flow channel (passage) and in which a heat transfer fluid flows.

The continuous flow reactor 102 or its flow channel (for example, microchannel) may have a heat transfer area per unit volume of the process side of at least 2500 square meters ($m^2$) per cubic meter ($m^3$), at least 5000 $m^2/m^3$, at least 7000 $m^2/m^3$, or at least 10,000 $m^2/m^3$. Continuous flow reactors 102 (including as microreactors) provide increased heat transfer as compared to batch reactors. The continuous flow reactor 102 may also generally provide increased heat transfer as compared to continuous reactors (not having a flow channel) such as tubular plug-flow reactors or continuous stirred-tank reactors (CSTR).

The continuous flow reactor 102 may have multiple modules each having a flow channel or flow microchannel. The modules may be arranged operationally (and physically) in series. For multiple modules in series, the channel in each module may be operationally coupled to give a flow channel for the reactor through the modules. The channel geometry can be different between the modules. With each module having a flow channel, the reactor 102 having multiple modules in series can be characterized as having multiple flow channels. However, because the flow channel in each module is coupled operationally in series, the reactor 102 having multiple modules in series is generally characterized as having a flow channel through the multiple modules.

Moreover, the continuous flow reactor 102 may be scalable in a sense of incorporating additional modules each having a flow channel to operationally couple to the flow channel through the existing modules. The continuous flow reactor 102 may include sensors, valves, and static mixers including as associated with the channel or microchannel. The modules of the flow channel may have various components including the sensors, valves, and static mixers in the channel and exterior to the channel. The number and size of the modules of the continuous flow reactor 102 may depend on the implementation scale of the continuous flow reactor system 100 for the specific reaction kinetics.

The continuous flow reactor system 100 may be laboratory scale that produces less than one kilogram per hour of polymer nanoparticles, such as less than 10 grams per hour of polymer nanoparticles. The continuous flow reactor system 100 may be pilot-plant scale or industrial scale that produces at least one kilogram per hour of polymer nanoparticles. A specified scale or production capacity of the continuous flow reactor 102 may be implemented, for example, by specifying the number of modules having a channel, the length and volume of the channel, the surface area of the channel, or by incorporating a batch tank after the flow reactor, or any combinations thereof. For the reactor 102 having modules of the channel(s), a specified scale of the continuous flow reactor 102 may be implemented, for example, via the number of modules, the length and volume of the channel per module, and the surface area of the channel per module. A module may have one channel. As discussed later, a module may have a flow-reactor plate having a channel.

In the illustrated implementation, the continuous flow reactor 102 includes a preheater 104 and a reaction section 106. Both the preheater 104 and the reaction section 106 may include a channel(s) or modules having a channel. The channel may be a microchannel. The preheater 104 may be a preheater section as one or more modules of the channel integrated within the continuous flow reactor 102. In some implementations, the preheater 104 may be separate from and upstream of the continuous flow reactor 102. If so, the preheater 104 may be a shell-and-tube heat exchanger, a plate-and-frame heat exchanger, or a jacketed-conduit heat exchanger.

The continuous flow reactor 102 may include a designated mixing section, for example, downstream of the preheater 104 but upstream of the reaction section 106. The mixing section may be integrated within the continuous flow reactor 102. The mixing section may be a sub-section of the reaction section 106. The mixing section may have a flow channel (for example, microchannel) or a static mixer, or both. The mixing section as a module(s) of a channel may include a mixer (for example, static mixer) in or between modules. The flow channel in a mixing section may have a geometry to promote mixing. The flow channel in the reaction section 106 downstream of the mixing section may also have a geometry to promote mixing. If the upstream preheater 104 employs the flow channel (e.g., as at least one module of the flow channel), the flow channel in the preheater 104 may promote mixing of the contents (mixture) flowing through the preheater 104 and being preheated.

In certain implementations, the mixing section is a module (having a flow channel) disposed between the preheater 104 and the reaction section 106. In some embodiments, the mixing section (if employed) may be a mixer (for example, static mixer or turbine mixer) separate from the continuous flow reactor 102 and operationally disposed between the preheater 104 and the reaction section 106.

In operation for certain embodiments, monomer fed to the reactor 102 may mix with an aqueous solution in the mixing section. In some implementations, the monomer is fed directly to the mixing section of the reactor 102. The aqueous solution may include an initiator. The aqueous solution may include the initiator and a surfactant. The aqueous solution may include the initiator and a water-soluble comonomer. The aqueous solution having the initiator or a mixture of the initiator and the surfactant or comonomer may be fed to the preheater 104 prior to entry of the aqueous solution into the mixing section. The reaction or polymerization may begin in the mixing section in some embodiments. If comonomer is present in the aqueous mixture, polymerization may begin in the upstream preheater 104.

The continuous flow reactor system 100 includes a monomer source 108 which provides monomer 110 for polymerization in the continuous flow reactor 102. In the illustrated embodiment, the monomer 110 is fed to the reaction section 106 downstream of the preheater 104. In certain implementations, the monomer is fed to a mixing section which is an initial or first portion of the reaction section 106.

The monomer source 108 may include one or more vessels holding monomer 110. The vessel may be a container, cylinder, gas cylinder, storage vessel, or feed vessel. In lieu of (or in addition to) a vessel housing monomer, the monomer source 108 may receive monomer 110 from a pipeline, railcar, or truck. The monomer source 108 may include a motive device (for example, pump) to provide monomer 110 through a conduit to the continuous flow reactor 102. In one implementation, the monomer 110 is an acrylate monomer. In another implementation, the monomer 110 is a styrenic monomer. A styrenic monomer may be styrene or a derivative of styrene.

The monomer source 108 may include a control component to modulate flow rate of the monomer 110 fed to the continuous flow reactor 102. For example, the speed of a pump as a motive device may be manipulated to adjust flow rate of monomer 110 through the pump to the continuous flow reactor 102. In another implementation, a control valve may modulate flow rate of the monomer 110 to the continuous flow reactor 102. The control valve may be disposed on a conduit conveying the monomer 110. In a particular implementation, the control valve is disposed on a conduit at or near the motive device, for example, at the discharge of the motive device (e.g., pump).

The monomer source 108 may provide two or more monomers including for the same polymerization, such as with the polymerization in the continuous flow reactor 102 of two monomers into a copolymer. Thus, in the case of the monomer 110 including a first monomer and a second monomer, the monomer source 108 may be characterized as a first monomer source and a second monomer source. In certain implementations, the second monomer may be labeled as a comonomer. In some instances, the first monomer may be labeled as the major monomer or primary monomer. In operation, the first monomer and the second monomer (comonomer) may be fed separately (in different conduits) to the continuous flow reactor 102, for example, to an initial portion (for instance, mixing section) of the reaction section 106. For monomer 110 fed to the continuous flow reactor 102, the monomer source 108 may control the ratio (by weight or volume) of the second monomer to the first monomer. In one implementation, the first monomer is an acrylate monomer and the second monomer (comonomer) is styrene or a styrenic derivative monomer. In another implementation, the first monomer is an acrylamide monomer and the second monomer (comonomer) is a styrenic monomer. A styrenic monomer may be styrene or a monomer derivative of styrene. Moreover, for particular embodiments, the second monomer or comonomer may be fed with initiator from the initiator source 112.

The continuous flow reactor system 100 includes an initiator source 112 that provides a stream 114 via a conduit to the continuous flow reactor 102. The stream 114 may be an initiator or a solution (for example, aqueous solution) having the initiator. The stream 114 may be a mixture having the initiator and water. The initiator may be a radical initiator. The amount of initiator in the mixture or aqueous solution may be, for example, in the range of 0.1 mole % (mol %) to 10 mol % of the total monomers fed to the reactor 102.

If a surfactant is employed in the polymerization in the reactor 102, the stream 114 may include the surfactant. Therefore, the stream 114 may include a mixture having the initiator and the surfactant. The mixture may also include water or other solvents (for example, alcohols). The concentration of the surfactant (if included) in the mixture or aqueous solution may be at least 0.2 weight percent (wt %). In some implementations, the surfactant is fed separately from the initiator to the preheater 104. Thus, in those implementations, the initiator and surfactant may meet and mix in the preheater 104 and further mix, for example, in a mixing sub-section of the reaction section 106 downstream of the preheater 104.

In some embodiments, the second monomer (if utilized) may be provided from the initiator source 112. Thus, the stream 114 may include a mixture of initiator and a second monomer (comonomer). The stream 114 may include a mixture of initiator, comonomer, and water. The concentration of comonomer in the aqueous mixture may depend on the polymerization recipe or the type or grade of copolymer being produced in the reactor 102. An exemplary amount of comonomer in the aqueous mixture is in the range of 5 mol % to 50 mol % of the combination of the comonomer and the major monomer added downstream. The stream 114 may include a mixture having initiator, surfactant, and comonomer. The stream 114 may include a mixture having initiator, surfactant, water, and comonomer.

In implementations, the stream 114 includes a mixture having initiator with surfactant, comonomer, or water (or other solvent such as an alcohol), or any combinations thereof. The source 112 may receive or prepare the mixture for stream 114. The source 112 may include vessels, motive devices, and control components. In the illustrated implementation, the source 112 feeds the stream 114 to the process side of the preheater 104 of the continuous flow reactor 102.

In some implementations, the initiator is a salt of sulfate. In a particular implementation, the initiator is ammonium persulfate (APS). The initiator may be a chain transfer agent (CTA) or reversible addition-fragmentation chain transfer (RAFT) agent. Examples of RAFT agents include dithioesters and trithiocarbonates. RAFT agents may be thiocarbonylthio compounds such as dithioesters, dithiocarbamates, trithiocarbonates, and xanthates. The initiator as a water-soluble or water-miscible radical initiator may be, for example, potassium persulfate, hydrogen peroxide, tert-butyl hydroperoxide, cumene hydroperoxide, benzoyl peroxide, 2,2'-azobis(2-amidino-propane)dihydrochloride, succinic acid peroxide, 4,4'-azobis(4-cyanopentanoicacid), 4-cyano-pentanoic acid dithiobenzoate, or 2,2'-azobis(2-amidino-propane)dihydrochloride.

The surfactant (if utilized) may be an anionic surfactant. In a particular embodiment, the surfactant is a sulfate in water. The sulfate may be, for example, sodium dodecyl sulfate (SDS). Surfactants as emulsifiers that may be employed include, for example, fatty acids, alkoxylates, sulfonates, and sulfates (for example, ether sulfates). A non-ionic surfactant may be utilized in combination with an anionic surfactant in the stream 114 mixture. The non-ionic surfactant may be, for example, phosphate esters, poly (ethylene oxide), poly(vinyl alcohol), or hydroxyethyl cellulose.

Surfactant-free emulsion polymerization may be performed with the flow reactor 102. In those implementations, surfactant is not fed to the reactor 102. In particular embodiments, a water-soluble monomer (for example, an acrylamide or acrylic acid) is utilized instead of a surfactant in the initiator mixture. In those embodiments, the stream 114 may include a mixture of initiator, the water-soluble monomer, and water. The solubility of the water-soluble monomer (comonomer) in water may be, for example, at a concentration in the range of 0.01 kilogram per liter (Kg/L) to 5 Kg/L at a temperature in a range of 20° C. to 90° C. The initiation of polymerization of the water-soluble monomer may start in the preheater 104 or preheating section of the flow reactor 102 to form short chains (for example, less than 50 carbons) of acrylamides. These short chains of acrylamides may then polymerize with the primary monomer (for example, styrenic monomer or acrylate monomer from the monomer source 108) in the reaction section 106 to form water-stable nanoparticles of copolymer (for example, styrenic-acrylamide copolymer). Both the water-soluble comonomer and surfactant may be included in the stream 114. The stream 114 may include a mixture of initiator, the water-soluble comonomer, surfactant, and water.

With or without the presence of surfactant, the polymer nanoparticles may include polymer from acrylamide or acrylic acid. The polymer nanoparticles produced in (and discharged from) the continuous flow reactor 102 may be water-stable or generally water insoluble. The polymer nanoparticles may be partially soluble in water or soluble in water.

The continuous flow reactor system 100 includes a heat-transfer fluid system 116 that provides a heat-transfer fluid supply 118 via a conduit to the continuous flow reactor 102. The heat-transfer fluid supply 118 may circulate through the reactor 102 and discharge as heat-transfer fluid return 120 via a return conduit to the heat-transfer fluid system 116. The heat-transfer fluid system 116 may include a motive device (for example, centrifugal pump) to provide a motive force (for example, pump head) to circulate the heat-transfer fluid through the reactor 102, such as through the utility side of the reactor 102 or utility side of the channel(s) of the reactor 102. The heat-transfer fluid system 116 may include a heat exchanger (for example, a shell-and-tube heat exchanger or a plate-and-frame heat exchanger) to heat or cool the heat-transfer fluid return 120. The heat-transfer fluid system 116 may include control valves (for example, control valve 122) for the heat transfer fluid and sensors (for example, temperature sensor 124) for the heat transfer fluid.

The heat-transfer fluid supply 118 may flow from the heat-transfer fluid system 116 through the utility side (flow layers for heat transfer fluid) of the continuous flow reactor 102 channel. Thus, the heat transfer fluid supply 118 generally does not mix with the process fluids or slurry on the process side (interior flow passage of the channel) of the continuous flow reactor 102. The heat-transfer fluid supply 118 may include mineral oil, treated water (for example, demineralized water), cooling tower water, steam condensate, steam, or a glycol fluid.

The heat-transfer fluid supply 118 may flow through the utility side of the preheater 104 and the utility side (heat-transfer fluid layers) of the reaction section 106. The heat-transfer supply 118 may include parallel or serial flow through the preheater 104 and the reaction section 106. A flow sequence of the circulation can be the heat-transfer fluid supply 118 enters through the reaction section 106 and then flows through the preheater 104. Another sequence is the heat-transfer fluid 118 initially flows through the preheater 104 and then through the reaction section 106. In other implementations, a first stream of heat-transfer fluid supply 118 may be sent to the preheater 104 in parallel with a second stream of heat-transfer fluid supply 118 sent to the reaction section 106. Multiple streams of heat-transfer fluid supply 118 may be sent in parallel to the reaction section 106, such as to respective modules of the channel in the reaction section 106. The return 120 may include two or more return 120 streams that may merge into a single conduit or be received independently in separate respective conduits to the heat-transfer fluid system 116.

The arrangement of the utility side of the reactor 102 channel may provide for cross-exchange of heat with the process side of the channel. The utility side may be a flow path or flow layer (in the reactor 102) adjacent to the channel for routing the heat-transfer fluid supply 118. The process side may be the interior volume of the channel in which the polymerization mixture flows. Heat may be transferred between the heat-transfer fluid supply 118 flowing through the utility side with the polymerization mixture flowing through the process side. The flow of the heat-transfer fluid supply 118 is typically countercurrent with flow on the process side but can be co-current flow.

As mentioned, the heat-transfer fluid system 116 receives the heat-transfer fluid return 120 via a conduit from the continuous flow reactor 102. The flow rate of the heat-transfer fluid supply 118 through the utility side of the continuous flow reactor 102 may be controlled. In certain embodiments, the flow rate of the heat-transfer fluid supply 118 is controlled via a control valve 122 on the return 120 conduit. The flow rate of the heat-transfer fluid supply 118 may be manipulated by the control valve 122 to control the preheating temperature by the preheater 104 and the polymerization temperature in the reaction section 106. In other embodiments, the preheater 104 does not participate in the heat-transfer fluid system 116 circulation but instead receives a heat-transfer fluid other than the heat-transfer fluid supply 118.

The heat-transfer fluid system 116 may provide the heat-transfer fluid supply 118 at a specified temperature or temperature range. The temperature of the supply 118 may be measured by a temperature sensor 124. Additional temperature sensors to measure temperature of the heat transfer fluid supply 118 may be disposed in the continuous flow reactor 102. A temperature sensor may be disposed on the return 120 conduit.

The heat-transfer fluid supply 118 may be a heating medium for the preheater 104. The heat-transfer fluid supply 118 may be a heating medium for the reaction section 106 if the polymerization is endothermic or for maintenance of the reaction section 106. The heat-transfer fluid supply 118 may be a cooling medium for the reaction section 106 if the polymerization is exothermic or for mitigation of excessive temperature.

The heat-transfer fluid system 116 may include two or more heat-transfer fluid systems. For instance, a first heat-transfer system 116 may supply a first heat-transfer fluid supply 118 as a heating medium to the preheater 104, and a second heat-transfer system 116 may supply a second heat-transfer fluid supply 118 as a cooling medium to the reaction section 106 (for example, if the polymerization is exothermic). Thus, the heat-transfer fluid supply 118 may include two or more supply 118 streams from two or more respective heat-transfer fluid systems 116. The return 120 may include two or more respective return 120 streams depending on the configuration and heating or cooling demands of the continuous flow reactor 102.

For the heat-transfer fluid supply 118 as a cooling medium, the heat-transfer fluid system 116 may cool the heat-transfer fluid return 120. The heat-transfer fluid system 116 may remove heat from the heat-transfer fluid return 120 that was acquired by the heat-transfer fluid supply 118 as a cooling medium in the continuous flow reactor 102. For the heat-transfer fluid supply 118 as a heating medium, the heat-transfer fluid system 116 may heat the heat-transfer fluid return 120. The heat-transfer fluid system 116 may add heat to the heat-transfer fluid return 120 to account for the heat loss by the heat-transfer fluid supply 118 as a heating medium in the continuous flow reactor 102.

In operation, the continuous flow reactor 102 polymerizes monomer 108 into polymer nanoparticles and discharges the polymer nanoparticles 126, for example, through a discharge conduit. The stream discharged may be a slurry of the polymer nanoparticles 126 in water or in water and surfactant. The slurry may include trace amounts of residual monomer and initiator. In some implementations, the polymer nanoparticles 126 produced are monodisperse or near-monodisperse (for example, PDI less than 0.08). At least 80% of the polymer nanoparticles 126 in the slurry may have the same particle size within a tolerance of 1 nm. The polymer nanoparticles 126 may be generally uniform as composed of molecules of the same or similar mass. The polymer nanoparticles 126 can be copolymer nanoparticles.

A modulating control valve 128 may be disposed on the discharge conduit to control or adjust flow rate of the slurry having the polymer nanoparticles 126 discharging from the continuous flow reactor 102. The control valve 128 may control or modulate pressure in the continuous flow reactor 102. The control valve 128 may facilitate maintaining a specified pressure on the process side of the channel(s) or microchannel(s). In some instances, the control valve 128 may be labeled as a backpressure regulator. The discharge may include a pressure sensor 130.

Additional pressure sensors may be disposed in the continuous flow reactor system 100 including on the utility side or process side of the reactor 102. One or more pressure sensors may be disposed along the reactor 102 on the channel and/or between modules of the channel. A pressure sensor may be disposed at the reactor 102 process inlet. The reactor system 100 may include other sensors, such as temperature sensors and flow sensors, disposed along the reactor 102.

The continuous flow reactor system 100 may include a control system 132. The control system 132 may include a processor and memory storing code (for example, instructions or logic) executed by the processor to facilitate control of the continuous flow reactor system 100. The processor may be one or more processors, and each processor may have one or more cores. The hardware processor(s) may include a microprocessor, a central processing unit (CPU), or a general-purpose graphics processing unit (GPU). The memory may include volatile memory (for example, cache and random access memory or RAM), nonvolatile memory (for example, hard drive, solid-state drive, and read-only memory or ROM), and firmware. The control system 132 may include a desktop computer, a console computer, multiple computing devices or nodes, a distributed control system (DCS), or a programmable logic controller (PLC). The control system 132 may include control components (for example, pumps or control valves) to modulate or maintain operating parameters of the reactor system 100. Operating parameters may include flow rate, pressure, and temperature on the utility side and process side of the reactor 102. The control system 132 may be operationally tied to pumps, control valves, and sensors in the reactor system 100. A user may input set points for operating parameters via the control system 132.

The continuous flow reactor 102 having the flow channel (for example, reactant-flow channel) may be a microreactor. The flow channel(s) may be microchannel(s) having a width or hydraulic diameter less than 1 mm. A scalable continuous flow reactor may be a microreactor. A continuous reactor without a channel or flow channel may be a tubular plug-flow reactor, a jacketed pipe reactor, a jacketed vessel reactor, a continuous stirred-tank reactor (CSTR), a loop reactor performing as a CSTR, or a fluidized-bed reactor. The continuous flow reactor having a channel(s) may provide for increased heat-transfer area as compared to these continuous reactors without a channel. The preheater 104 (if employed) may be a preheating section (for example, a channel) of the reactor 102, a shell-and-tube heat exchanger, a plate-and-frame heat exchanger, or a jacketed-conduit heat exchanger. The mixing section (if employed) may be a channel in the reactor 102, a static mixer, or a turbine mixer, or any combinations thereof.

An embodiment is a continuous flow reactor system having a continuous flow reactor with a channel such as a flow channel for reactant flow. The continuous flow reactor system includes a first source to supply a mixture to the continuous flow reactor. The mixture includes a radical initiator and water. The mixture may include a surfactant or a comonomer. The first source may have a mixer to combine the radical initiator, water, surfactant (if present), and comonomer (if present). In addition, the first source may have a control component to modulate flow rate of the mixture to the continuous flow reactor. The first source may have a motive device (for example, pump) to supply the mixture to the continuous flow reactor. In some implementations, a pump as a motive device is the control component in that speed of the pump may modulate flow rate of the mixture. The continuous flow reactor may have a preheater section to heat the mixture from the first source. If the continuous flow reactor has a preheater section, the first source may supply the mixture to the preheater section.

The continuous flow reactor system has a second source to supply monomer to the continuous flow reactor. The second source may have a control component to modulate flow rate of the monomer to the continuous flow reactor. The second source may have a motive device to supply the monomer to the continuous flow reactor. The monomer may include major monomer if a comonomer is supplied from the first source. The monomer may include the major monomer and the comonomer if the comonomer is not supplied from the first source. In particular implementations, the monomer source may supply comonomer to the first source. The continuous flow reactor has a mixing section to mix the monomer with the mixture from the first source to form a polymerization mixture. The continuous flow reactor has a reaction section to polymerize the monomer (including any comonomer present) in the polymerization mixture to form polymer nanoparticles.

The preheater section (if employed), the mixing section, and the reaction section may each include the flow channel. The mixing section may be an initial subsection of the reaction section. The flow channel may have a hydraulic diameter greater than 1 mm. In some implementations, a static mixer may be installed in the flow channel. The continuous flow reactor may be a microreactor. The channel may be a microchannel having a hydraulic diameter less than 1 mm. The flow channel may have a geometry (for example, heart-shaped, bends) or features (for example, grooves, slots, ridges, or baffles) to promote mixing or static mixing of the fluid or slurry flow through the channel.

The continuous flow reactor system may include a heat-transfer fluid system to circulate heat transfer fluid through a utility side of the reactor. The utility side may be for utility flow such as a heat-transfer fluid. Thus, the utility side may be labeled as heat transfer layers. The utility side or utility flow path may be adjacent the exterior of the channel. Thus, the utility side of the reactor may be characterized as a utility side of the channel.

EXAMPLES

Figure 2:
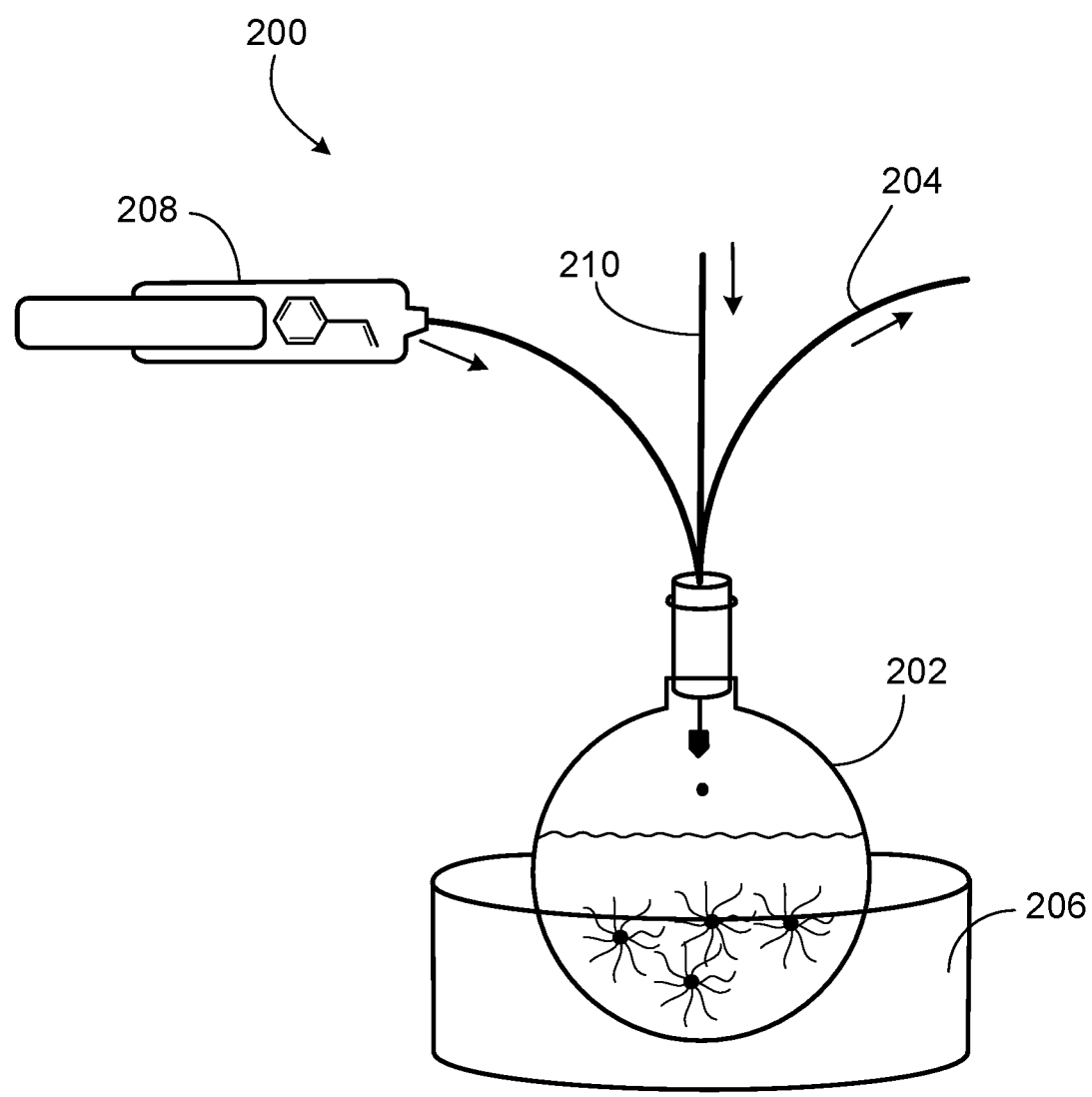
FIG. 2 is a perspective view of a laboratory configuration for a batch synthesis of polymer nanoparticles.

FIG. 2 is a laboratory configuration 200 for a batch synthesis of polymer nanoparticles. In this experimental setup, the batch synthesis of the polymeric nanoparticles commenced with degassing a 60 milliliter (mL) solution of 2.55 wt % sodium dodecyl sulfate (SDS) in water in a round bottom flask 202. At this concentration, the surfactant is greater than its critical micelle concentration (CMC). Gas was removed from the flask 202 via outlet tube 204. Next, 100 milligrams (mg) of the radical-initiator ammonium persulfate (APS) was added to the solution in the flask 202. The solution in the flask 202 was heated via a heating bath 206 for fifteen minutes (min) at 90° C. The solution was stirred (maintained as a stirring solution) throughout the heating and subsequent polymerization. The solution was maintained at a temperature of 90° C. while 1 mL of monomer was added via syringe 208 dropwise into the solution of 2.55 wt % SDA in water and APS in the flask 202. Nitrogen was introduced through the inlet tube 210 to maintain a nitrogen pad in the flask 202.

In a first test, the monomer was butyl methacrylate (BMA). In a second test, the monomer was a styrene-butyl methacrylate mixture having a molar ratio 95:5 of styrene to BMA. These non-water soluble monomers reacted with the radical initiator (giving polymer initiation) while diffusing into the micelles to continue propagation. The reaction in the first test proceeded for one hour after monomer addition to complete polymerization of poly(butyl methacrylate) (PBMA) nanoparticles (NP). The reaction in the second test proceeded for one hour after monomer addition to complete polymerization of copolymer poly(styrene-co-butyl methacrylate) (PSBMA) NPs. These emulsion polymerizations allowed for nucleation sites to form resulting in nanoparticles of particle size in a range of 10 nm to 25 nm, as analyzed by dynamic light scattering (DLS).

Figure 3:
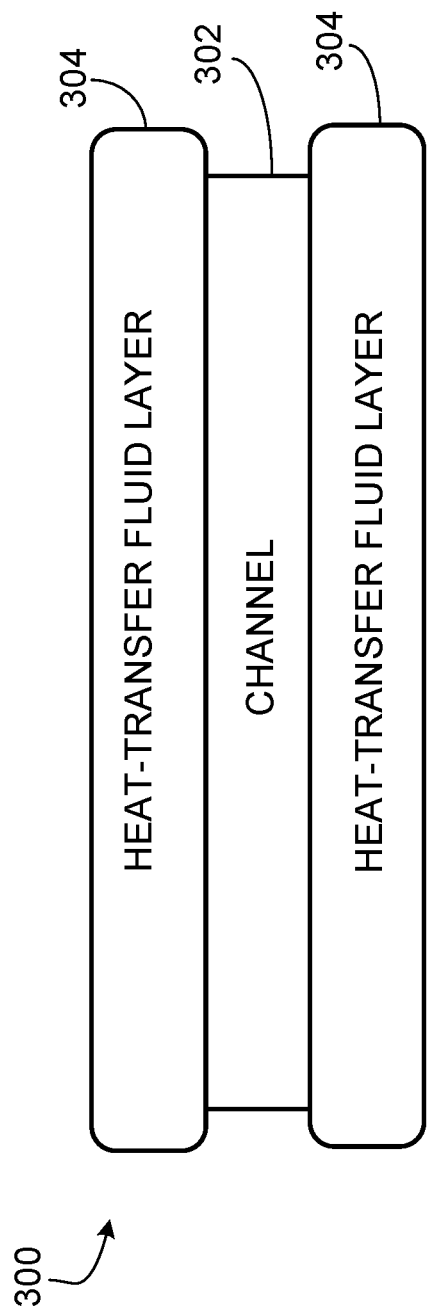
FIG. 3 is a simplified diagram of a module plate in the continuous flow reactor utilized in the Examples for the laboratory flow synthesis of polymeric nanoparticles.

FIG. 3 is a flow-reactor plate 300 as representative of the multiple flow-reactor plates (coupled in series) of the continuous flow reactor used in the Examples for the laboratory flow synthesis that gave polymeric nanoparticles. Each flow-reactor plate 300 coupled in series may be labeled as a module having that respective flow-reactor plate 300.

The plate 300 includes a flow channel 302 for flow of reactant(s) and the polymerization mixture. The flow channel 302 may promote mixing. The plate 300 includes two heat-transfer fluid layers 304 adjacent the flow channel 302. The layers 304 are flow passages for heat transfer fluid that may be heating fluid or cooling fluid.

In the Examples, the continuous flow reactor is a Corning® G1 Advanced-Flow™ Reactor by Corning Inc. of Corning, New York, USA. Each module of the reactor has a single plate 300 and a support. The flow reactor has multiple modules in series. Thus, the flow reactor is composed of plates 300 in series. The plates 300 in the flow reactor include hybrid glass-silicon carbide (SiC) plates attached in series.

Design conditions for the flow reactor is a flow rate of 30 milliliters per minute (mL/min) to 200 mL/min through the channel 302, temperatures of −60° C. to 200° C., and pressures up to 18 bar gauge (barg) (261 psig). Each plate 300 is designed for mixing and heat transfer. Mixing is achieved via the flow channel 302. Temperature is controlled via the two heat-transfer fluid layers 304 that flow heat transfer fluid.

The flow channel 302 include a mixing channel or a static mixing channel (for example, heart-shaped static mixing channel). A separate static mixer was not installed in the channel 302 but instead the geometry (including features) of the channel 302 promoted mixing or static mixing.

The inside or interior of the channel 302 may be characterized or labeled as the process side of the channel 302 or the process side in the reactor. The two heat-transfer fluid layers 304 adjacent the channel 302 may be characterized or labeled as the utility side of the channel 302 or a utility side in the continuous flow reactor.

Each reactor module has a single plate 300. Each plate 300 includes a single flow channel 302 wrapped by heat-transfer fluid layers 304.

Figure 4:
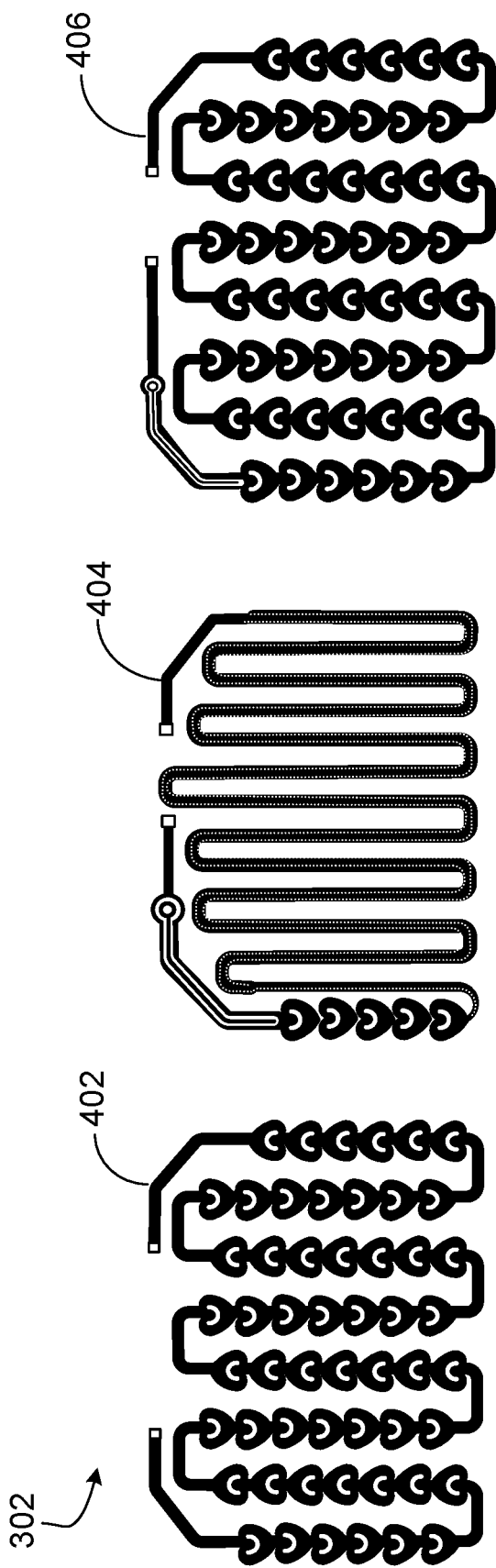
FIG. 4 is a diagram of a channel in the module plates of the continuous flow reactor in the Examples for the flow synthesis.

FIG. 4 are types of the flow channel 302 used in the respective module plates 300 of the Corning® G1 Advanced-Flow™ Reactor for the flow synthesis in the Examples in the laboratory. The heat-transfer fluid layers 304 (not shown) are on the exterior of the channel 302.

The flow channel 402 is for the Corning G1R*H module plate. The flow channel 404 is for the Corning G1SHF module plate. The flow channel 406 is for the Corning G1SHH module plate. The flow channel for the Corning 1G1SHH33 module plate utilized in the reactor is not depicted. Each reactor module has a single plate having a single flow channel that couple in series to give the single flow channel of the reactor.

For the fluid reactant flow, the single channel 302 of each plate 300 may have one inlet or multiple inlets. The channel 302 flow path and geometry (for example, heart-shaped) provide for mixing or static mixing without installation of a distinct static mixer. The particular channel 302 may have interior grooves to promote mixing or static mixing. In other implementations, a continuous flow reactor has a static mixer installed inside a flow channel.

The Corning G1SHH module plate channel 406 has an internal volume of 8.2 mL and a heart-shaped design that generates mixing. The Corning G1R*H module plate channel 402 has an internal volume of 8.2 mL and the heart-shaped design. The inlet and outlet configuration of the channel 402 facilitates use of the G1R*H module for pre-heating (or precooling) or to increased residence time. The Corning G1SHF module plate channel 404 has an internal volume of 9.2 mL and a hybrid design of heart-shaped and non-heart shaped. Finally, the Corning 1G1SHH33 module plate channel (not shown) has an internal volume of 8.2 mL. The 1G1SHH33 module is from the Corning® Advanced-Flow™ G1 SiC Reactor. The silicon carbide-glass of the 1G1SHH33 module plate provides chemical durability for basic solutions.

Figure 5:
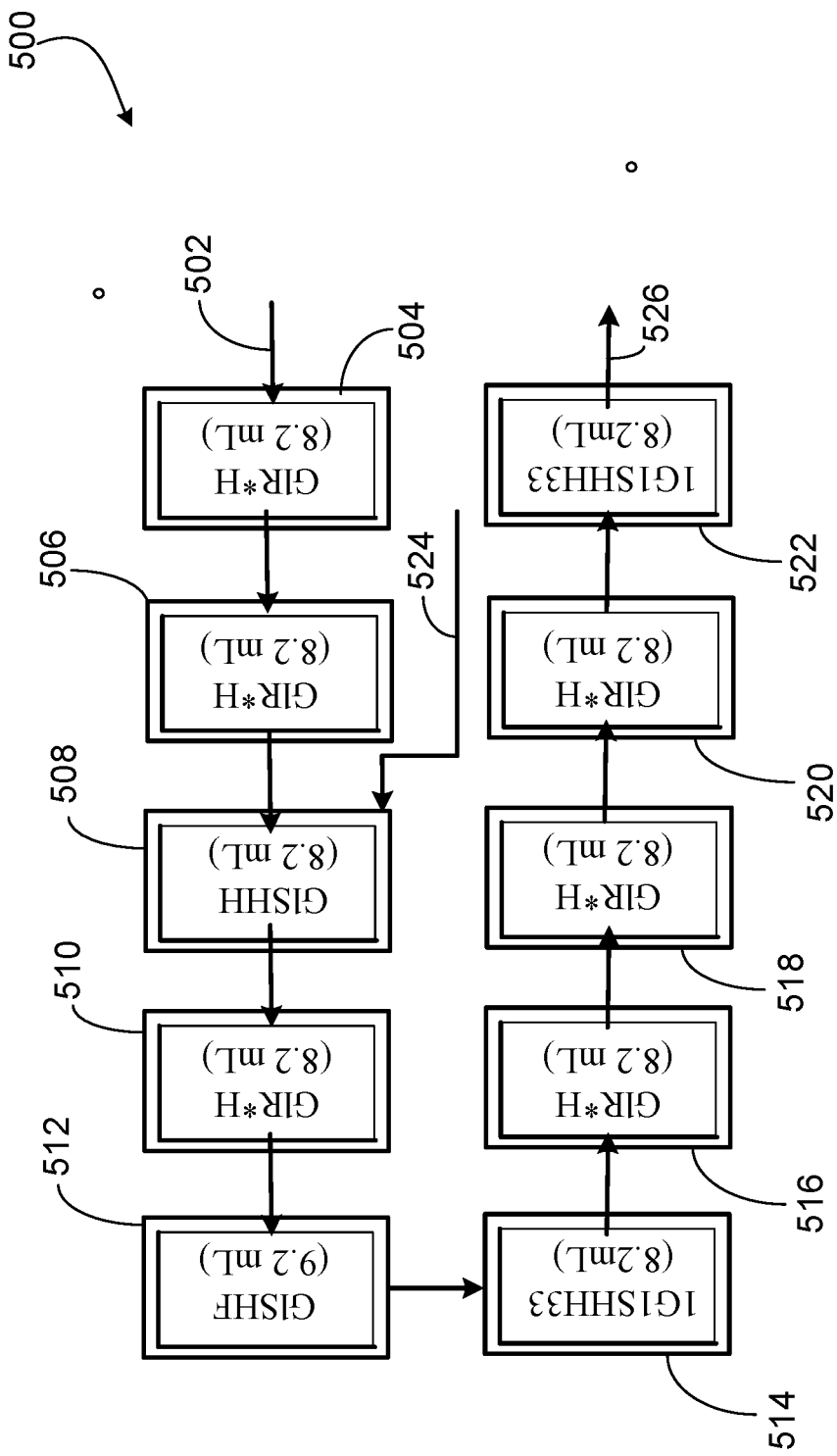
FIG. 5 is a set-up diagram of the continuous flow reactor in the Examples for the flow synthesis.

FIG. 5 is the setup of reactor modules for the continuous flow reactor 500 (Corning® G1 Advanced-Flow™ Reactor) utilized in the laboratory flow synthesis in the Examples. Each overall rectangle in FIG. 5 is a module. There is one plate per module. There is one flow channel per plate.

The continuous flow reactor 500 is composed of ten modules of plates in the following sequence: the G1R*H module 504 plate, the G1R*H module 506 plate, the G1SHH module 508 plate, the G1R*H module 510 plate, the G1SHF module 512 plate, the 1G1SHH33 module 514 plate, the G1R*H module 516 plate, the G1R*H module 518 plate, the G1R*H module 520 plate, and the 1G1SHH33 module 522 plate. In FIG. 5, the internal volume of the plate flow channel in the respective module is given for each module. This setup of the reactor 500 made up a total internal volume of 74.8 mL (bypass module 506 plate), which passed reactant fluid through the reactor 500 in 147 seconds (2.45 minutes) at a flow rate of 30.5 mL/min.

In the flow synthesis, a stream 502 maintained at ambient temperature after nitrogen (N2) purge was pumped into the module 504 at a rate of 30 mL/min. The stream 502 was heated in 504 module to 87° C. within 16.4 seconds (0.27 minute) prior to being pumped through the second module 506. The stream 502 was an SDS-water-initiator solution.

The first two modules 504, 506 preheated the SDS-water-initiator solution that entered the module 504 as stream 502. The first module 504 preheated the SDS-water-initiator solution to 87° C. The module 506 was primarily for passing through SDS-water-initiator solution. The module 508 was primarily for mixing SDS-water-initiator solution with the introduced monomer 524. The monomer 524 after $N_2$ purge was pumped at a rate of 0.5 mL/min to the third module 508 where the monomer 524 met the preheated aqueous solution of SDS and the initiator. The reaction (polymerization) started in the third module 508 and proceeded through the flow reactor 500 for a total of 2.45 minutes of residence time in the reactor 500. The modules 510, 512, 514, 516, 518, 520, and 512 were primarily for reaction but with continued mixing.

The flow reactor 500 having the depicted setup did not have adequate internal volume to provide one hour of residence time to complete the polymerization. Therefore, the polymerization solution 526 discharged from the continuous flow reactor 500 was collected in a heated round-bottom flask. The polymerization solution 526 was stirred in the flask for one hour at 90° C. to complete formation of the polymer nanoparticles. If the flow reactor 300 has adequate internal volume to provide one hour of residence time, this emulsion polymerization can instead be performed completely in the continuous flow reactor 300.

The one-hour flask polymerization to complete the polymerization can be considered a batch operation combined with the upstream continuous operation of the flow reactor 300. However, the results in the Examples discussed later when referring to flow synthesis are for the combined synthesis of 2.45 minutes in the flow reactor plus the 1-hour batch synthesis in the flask. When the results in the Examples refer to batch synthesis or batch operation, the results are for only batch synthesis (FIG. 2) in the flask with no upstream flow synthesis.

The synthesis performed with the flow synthesis (initial flow synthesis followed by the batch synthesis to complete the polymerization) resulted in nanoparticles having a different size and PDI compared to the nanoparticles synthesized only in the batch process. The polymerizations were compared via a varied molar ratio of monomer to initiator, M:I, as shown in Table 1. The molar ratio of styrene to butyl methacrylate for the copolymer is 95:5. All reactions performed in the batch and flow syntheses were at the same constant SDS concentration (2.55 wt % in water). The data for the four flow-synthesis reactions A, B, C, and D are presented in Table 1. The amount of initiator in reactions C and D was one tenth of the amount of initiator used in reactions A and B.

TABLE 1

| | Varied M:I conditions | | | |
| --- | --- | --- | --- | --- |
| | Monomer | Amount (mol) | Initiator (mol) | mol Monomer: mol Initiator |
| A | Butyl Methacrylate | 0.00314 | 0.000022 | 143 |
| B | Styrene-Butyl Methacrylate | 0.00457 | 0.000022 | 208 |
| C | Butyl Methacrylate | 0.00314 | 0.00022 | 14.3 |
| D | Styrene-Butyl Methacrylate | 0.00457 | 0.00022 | 20.8 |

Nanoparticle hydrodynamic size and polydispersity characterization were performed via DLS. Polymer yield was determined via thermogravimetric analysis (TGA) at a scan rate of 20° C./min. Polydispersity index (PDI), dispersity index, heterogeneity index, or dispersity (Đ) can be a measure of the distribution of molecular mass in a given polymer sample. However, PDI (or Đ) of a colloidal system is the size distribution of the particles.

Figure 6:
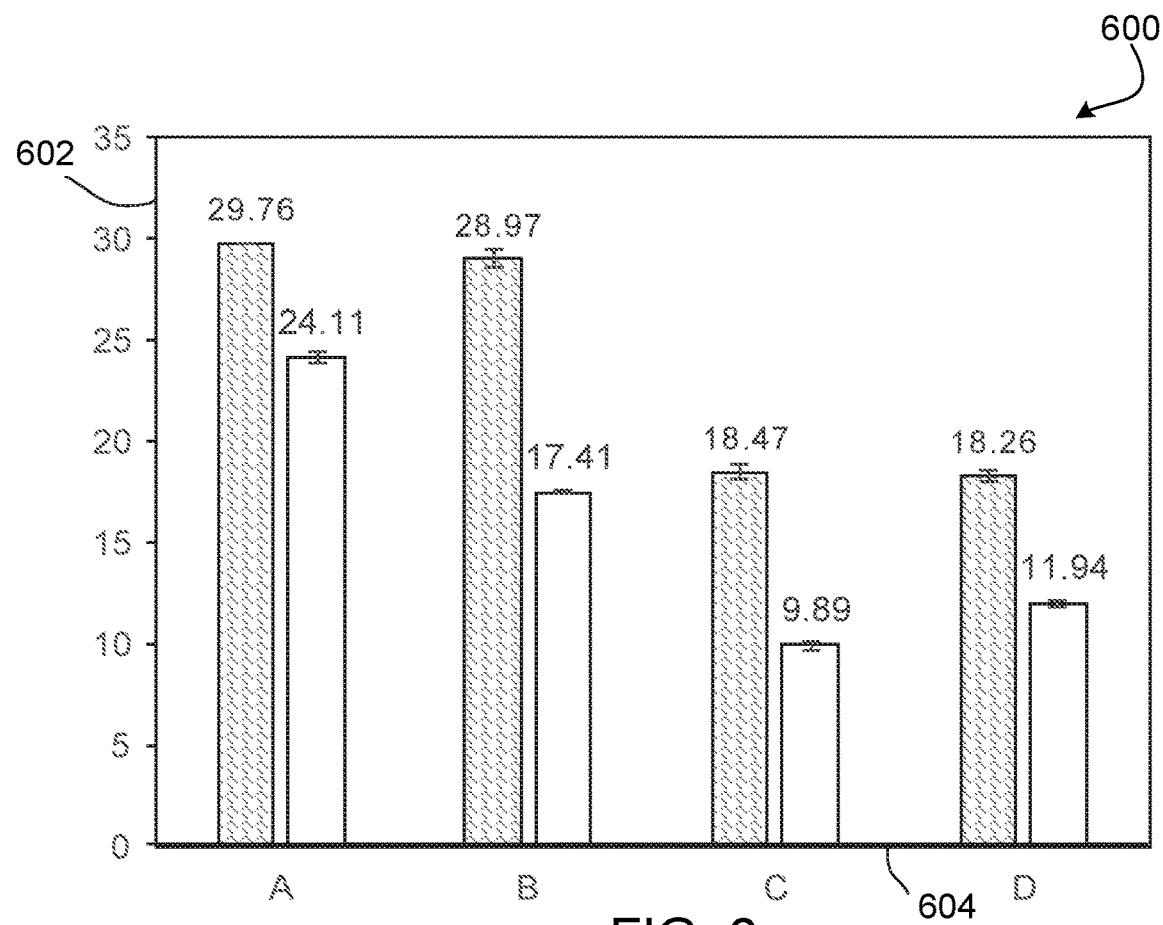
FIG. 6 is a bar chart of particle size of the produced polymer nanoparticles in the Examples.

FIG. 6 is a bar chart 600 of particle size 602 (nm) of the produced polymer nanoparticles versus the M:I condition 604 listed in Table 1. The patterned bars are for the flow synthesis. The clear bars are for the batch synthesis. Thus, FIG. 6 is particle size comparison of PBMA and PSBMA nanoparticles synthesized in a flow reactor (patterned bars) versus in a batch flask (clear bars). Labels A, B, C, and D correspond to Table 1.

Figure 7:
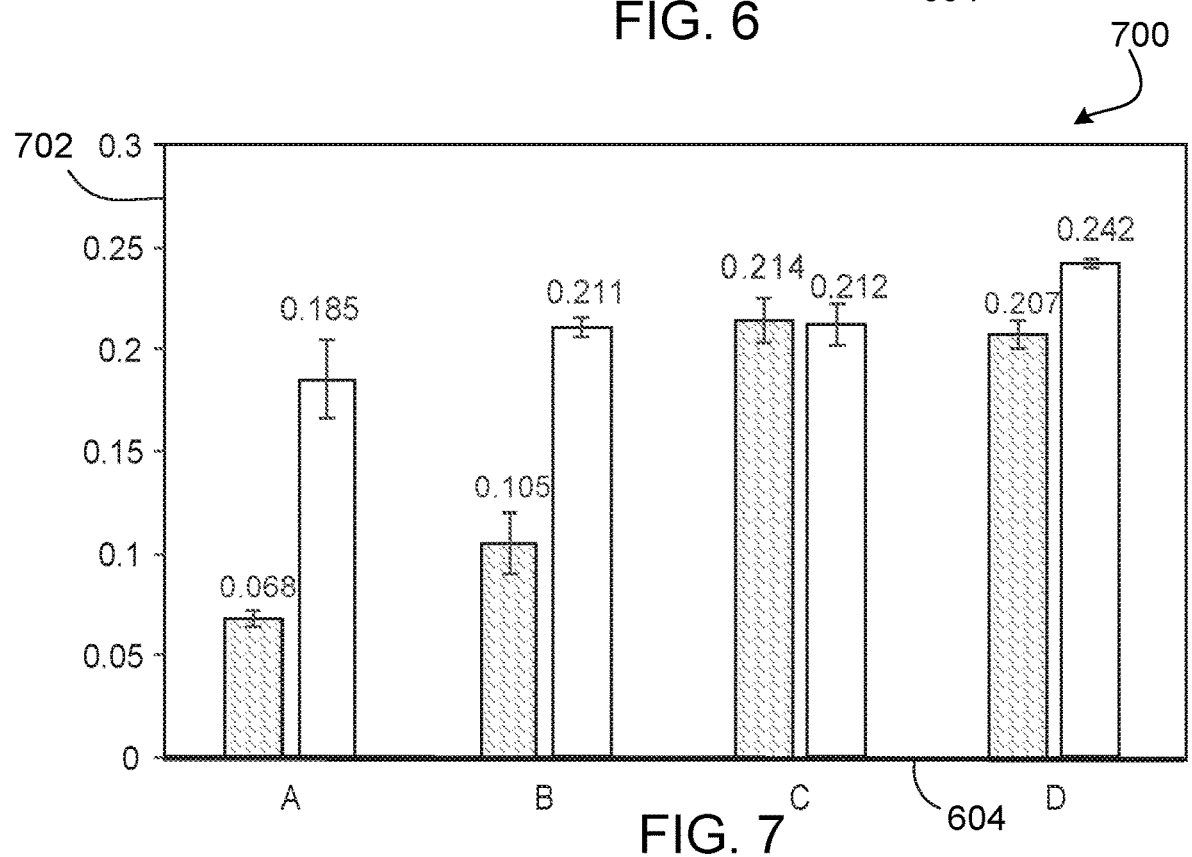
FIG. 7 is a bar chart of polydispersity index of the produced polymer nanoparticles in the Examples.

FIG. 7 is a bar chart 700 of polydispersity (PDI) 702 of the produced polymer nanoparticles versus the M:I condition 604 listed for A, B, C, and D in Table 1. The patterned bars are for the flow synthesis. The clear bars are for the batch synthesis. Thus, FIG. 7 is polydispersity comparison of PBMA and PSBMA nanoparticles synthesized in a flow reactor (patterned bars) versus in a batch flask (clear bars). The PDI reported is for size distribution of particles. The calculation of PDI is:

$$\frac{\Sigma N d^4 * \Sigma N d^6}{(\Sigma N d^5)^2} - 1,$$

where d is the average hydrodynamic size of the particles and N is the number of particles for the summation.

The reaction conditions A and B performed in the flow reactor (plus the completion in the flask) resulted in PBMA and PSBMA particles, respectively, of 29±0.23 nm in size and PDIs 0.1. The corresponding reactions (not in Table 1) performed only in the batch flask 202 formed particles of 10 nm to 25 nm in size and with PDIs 0.2. See FIGS. 6 and 7. The larger particle size made in the flow reactor compared to batch flask synthesis stems from the difference in monomer:initiator loading. In the batch synthesis, the monomer is slowly added dropwise into the reaction mixture. This results in a changing M:I ratio throughout the monomer addition allowing for nucleation sites (and thus more particles) to form initially but with the particles being smaller size. In contrast for the flow synthesis, the monomer meets the initiator in the solution at a constant M:I ratio. The M:I ratio in the flow synthesis is greater than the M:I ratio initially in the batch flask synthesis but less than the final M:I ratio in the batch flask synthesis. Consequently, fewer but larger particles form in the flow synthesis than in the batch synthesis. Flow synthesis, however, may have an advantage of making particles of lower polydispersity than in the batch synthesis. In some cases, the flow synthesis may make monodisperse particles or near-monodisperse (for example, PDI less than 0.1) due to the mixing and heat transfer. See FIG. 7.

The reaction conditions C and D performed in the flow reactor resulted in particles of 18±0.3 nm in size and PDIs 0.2. The corresponding reactions (not in Table 1) performed in the batch synthesis formed particles of approximately 10 nm and comparable PDIs 0.2. Overall, the size of the particles under these conditions in the flow and batch syntheses decreased due to the increase in initiator and the PDIs remained consistently 0.2. The mixing and heat transfer in the flow reactor did not decrease the PDIs at these reaction conditions. At this greater initiator loading, the number of nucleation sites may be the source of the overall greater PDIs. The flow synthesis resulted in different yields compared to the batch process, as discussed later with respect to FIGS. 8 and 9.

Figure 8:
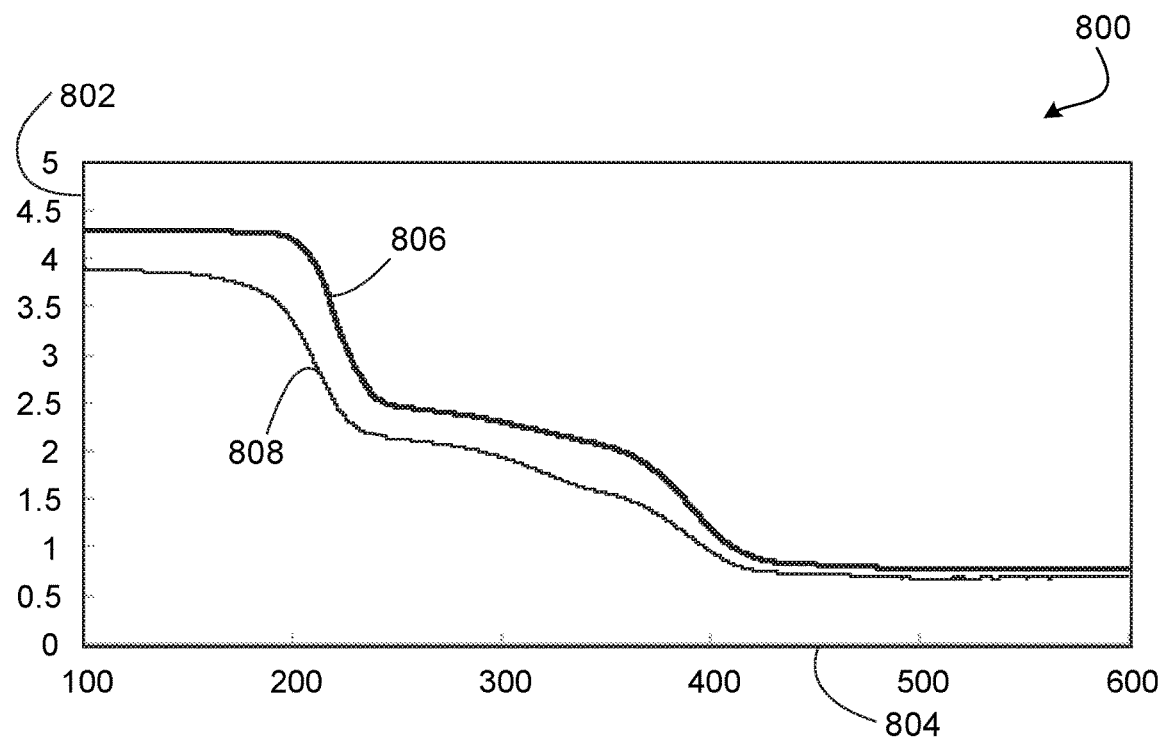
FIG. 8 is a plot of thermogravimetric analysis (TGA) curves for nanoparticles produced with the reaction condition A.

FIG. 8 is a plot 800 of TGA curves in weight percent 802 versus temperature 804 (° C.) for the reaction condition A (Table 1). For both the batch synthesis and the flow synthesis at the polymerization reaction condition A, the produced slurry of nanoparticles in surfactant and water was subjected to TGA. In the TGA, the water evaporated at 100° C. The water was about 96 weight % of the slurry. The TGA curves in FIG. 8 start after the water has been removed. The TGA curve 806 is for the flow synthesis. The TGA curve 808 is for the batch synthesis.

Figure 9:
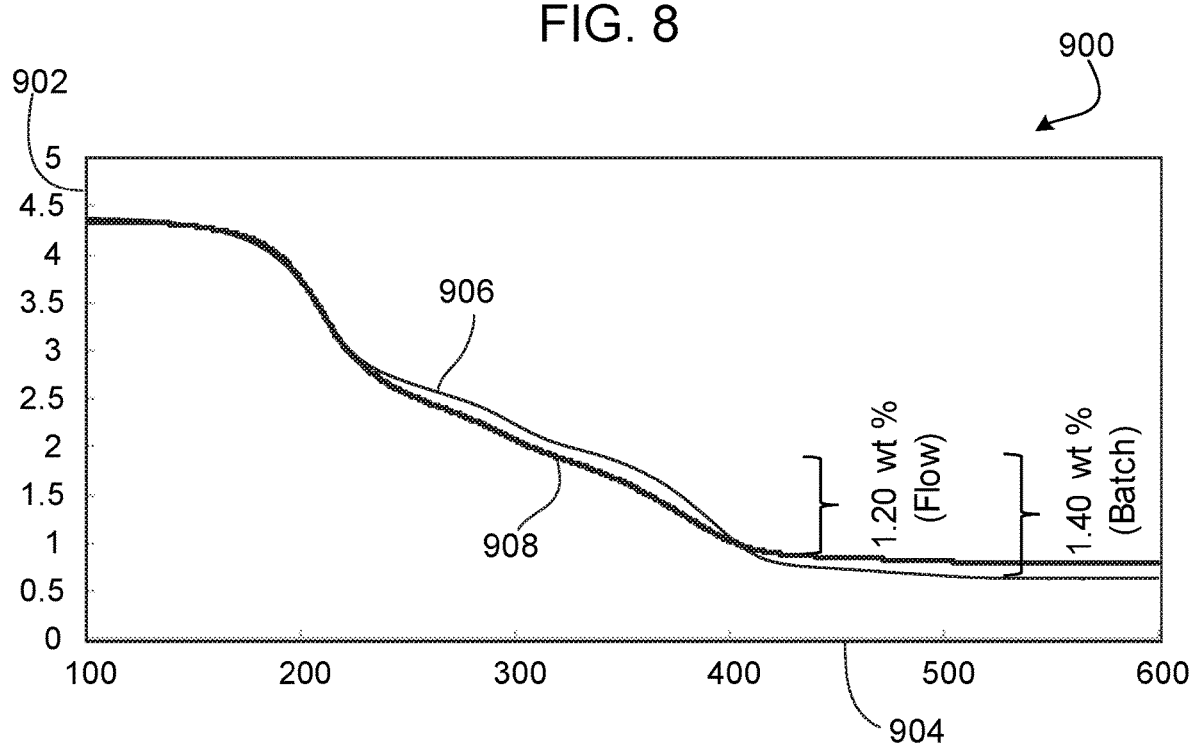
FIG. 9 is a plot of TGA curves for nanoparticles produced with the reaction condition C.

FIG. 9 is a plot 900 of TGA curves in weight percent 902 versus temperature 904 (° C.) for the reaction condition C (Table 1). For both the batch synthesis and the flow synthesis at the polymerization reaction condition B, the produced slurry of nanoparticles in surfactant and water was subjected to TGA. In the TGA, the water evaporated at 100° C. The water was about 96 weight % of the slurry. The TGA curves in FIG. 9 start after the water has been removed. The TGA curve 906 is for the batch synthesis. The TGA curve 908 is for the flow synthesis.

Thus, yields were determined using TGA. TGA showed that water evaporated at 100° C. (not shown in FIG. 8 and FIG. 9) and that SDS then decomposed at 225° C. Finally, the polymeric NPs decomposed at 390° C. For the reaction condition A, the flow synthesis resulted in a 1.5 times greater yield than that of the batch synthesis (see FIG. 8). As mentioned previously, the mixing that is a product of a greater flow rate and the static-mixing channel in the Corning flow reactor warrants the increase in yield. Additionally, the TGA results illustrate that the flow reactor synthesized NPs have more equally-distributed molecular weight compared to that of the batch synthesis.

The TGA of the polymerization results show an additional small weight loss at about 390° C. where nanoparticles of smaller molecular weight decomposed. For the reaction condition C, this additional weight loss was approximately 1.20 wt % (flow synthesis) and 1.40 wt % (batch synthesis).

For reaction condition C, TGA results as indicated in FIG. 9 revealed that the flow synthesis resulted in a similar yield and molecular weight distribution as the batch synthesis. As noted, the greater initiator concentration increased the overall quantity of nucleation sites. As a result, the reaction conditions C and D yielded nanoparticles of greater PDI than in reaction conditions A and B. For the reaction condition C, the mixing and heat transfer in the flow reactor did not affect the PDI for the nanoparticle yield in remaining similar as with the batch synthesis.

The flow synthesis may hold an advantage in how fast polymerizations are completed for scale-up synthesis in the laboratory. The batch polymerization involves longer reaction times (than flow polymerization) for making tens of grams of dispersed NPs. Scaling-up the batch process in a larger flask demands long reaction times (for example, greater than 10 hours) for making dispersed NPs because of the drop-wise addition of monomers (or addition of monomer using a syringe pump or similar motive device). Further, the mixing is typically less efficient in a larger flask. In comparison, the Corning continuous flow reactor can accomplish approximately a 27-gram NP synthesis within 1.5 hrs. (Table 2). The NP synthesis can be done continuously using a flow reactor with about 1.8 liter (L) of internal volume. Table 2 gives a basis of the reaction conditions A and C.

TABLE 2

Parameters for scaling up NP synthesis (to 27 g of styrene) in the flow reactor.

| | A | C |
|---|---|---|
| Monomer flow (mL/min) | 0.5 | 0.5 |
| Monomer flow (mol/min) | 0.00314 | 0.00314 |
| Initiator flow (mol/min) | 0.000022 | 0.00022 |
| Water/SDS flow (mL/min) | 30 | 30 |
| M:I Molar ratio | 143.2 | 14.3 |
| Residence time (sec) | 146.8 | 146.8 |
| Total flow time (min) | 59.4 | 59.4 |
| Total reaction time (min) | 121.85 | 121.84 |

For the Examples, the flow synthesis of PSBMA nanoparticles and PBMA nanoparticles made nanoparticles of equal or better (greater) polydispersity at shorter reaction times compared to a batch synthesis in a flask. The flow synthesis of monodispersed PBMA nanoparticles and monodispersed PSBMA nanoparticles was demonstrated in a Corning flow reactor with a usage of 74.6 ml of the 83 mL internal volume. The flow process may be beneficial for scaling up NP synthesis to tens or hundreds of grams in laboratory with desired particle size and particle size distribution. Analysis may consider synthesis in flow versus batch using other methacrylate and styrene-based monomers. Also considered may be the effect of flow rates, reaction temperatures, and different M:I ratios on the kinetics of the flow synthesis.

Figure 10:
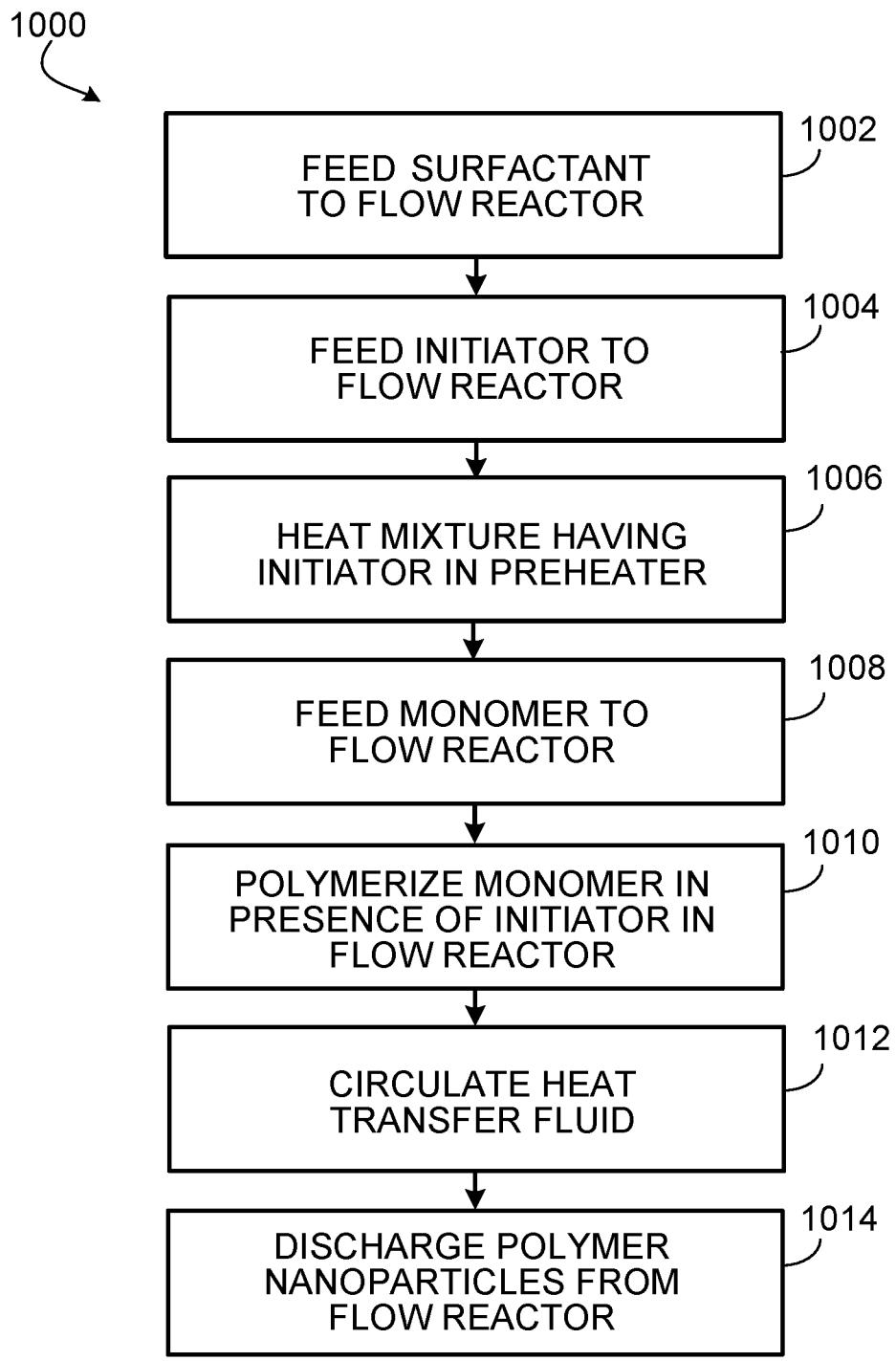
FIG. 10 is a block flow diagram of a method of flow synthesis of polymer nanoparticles.

FIG. 10 is a method 1000 of flow synthesis of polymer nanoparticles in a flow reactor such as a continuous flow reactor having a flow channel. In certain embodiments, the continuous flow reactor is a microreactor. In some implementations, the flow channel is a flow microchannel having a hydraulic diameter of less than 1 mm.

At block 1002, the method may include feeding a surfactant (for example, an anionic surfactant) to the continuous flow reactor. However, in embodiments, a surfactant is not fed the continuous flow reactor. Instead, the polymerization in the continuous flow reactor may be a surfactant-free polymerization.

At block 1004, the method includes feeding an initiator to the continuous flow reactor. The initiator may be a radical initiator. The method may include feeding a mixture having the initiator to the continuous flow reactor. The mixture may include water. The mixture may include the surfactant if utilized. Instead of feeding a surfactant independently to the continuous flow reactor, the surfactant (if utilized) may be fed in the mixture with initiator to the continuous flow reactor. The mixture may include a water-soluble comonomer.

The mixture generally includes initiator and water. The mixture may further include surfactant or water-soluble comonomer.

At block 1006, the method includes heating the mixture (block 1004) having the initiator in a preheater or preheating section of the continuous flow reactor. The preheater or preheating section may be a flow channel or flow channels. The heating may be by circulating heat transfer fluid on a utility side (for example, flow layers) of the preheater or of the continuous flow reactor.

At block 1008, the method includes feeding monomer to the continuous flow reactor. The method may include mixing the monomer with the mixture (having the initiator) in a mixing section of the continuous flow reactor to form the polymerization mixture. In certain embodiments, the mixing section receives the mixture (having the initiator) from the preheater or preheater section. In some implementations, more than one monomer may be fed to the continuous flow reactor.

In certain implementations, the monomer is a vinyl monomer (for example, an acrylate monomer) and the polymer nanoparticles produced are a vinyl polymer (for example, an acrylate polymer). In some embodiments, the monomer includes a first vinyl monomer (for example, an acrylate monomer) and a second vinyl monomer (for example, styrene or a styrenic monomer generally). In those embodiments, the polymer nanoparticles may be a copolymer. The method may include controlling a weight ratio (or mole ratio) of a first vinyl monomer (for example, an acrylate monomer) to the second vinyl monomer (for example, styrene) to reduce agglomeration of the polymer nanoparticles. Moreover, as indicated, the second monomer (comonomer) may be fed in the mixture having the initiator to the reactor.

At block 1010, the method includes polymerizing the monomer in presence of the initiator in the continuous flow reactor to form the polymer nanoparticles. The method may include forming the polymer nanoparticles from a polymerization mixture in a process side of the flow channel(s). The polymerization mixture includes the monomer and the initiator. The polymerizing of the monomer(s) may be an emulsion polymerization. The polymer nanoparticles may have a particle size less than 50 nm. The polymer nanoparticles may be monodisperse or near-monodisperse having a PDI less than 0.1 or less than 0.05.

At block 1012, the method includes circulating heat transfer fluid through a utility side of the flow channel to control temperature of the polymerization mixture. In one embodiment, the heat transfer fluid is oil such as mineral oil. The continuous flow reactor may have a heat transfer area per unit volume of the process side (inside volume of the flow channel) of at least 5000 $m^2/m^3$. The utility side may a utility side of the continuous flow reactor. The utility side may be flow passages or flow layers in the continuous flow reactor adjacent the flow channel.

At block 1014, the method includes discharging polymer nanoparticles from the continuous flow reactor. The discharging of the polymer nanoparticles may involve discharging a slurry from the continuous flow reactor. The slurry may include the polymer nanoparticles and water (and surfactant if utilized in the polymerization). The slurry may also include any residual (unreacted) monomer.

An embodiment is a method of flow synthesis of polymer nanoparticles. The method includes feeding a mixture having a radical initiator to a continuous flow reactor having a flow channel. The mixture may include water. The mixture may include a surfactant (for example, anionic surfactant) in certain implementations. The surfactant (if present and utilized) may be fed separate from the mixture to the continuous flow reactor or in the mixture having the initiator to the continuous flow reactor. In a particular implementation, the mixture (having the initiator) includes a water-soluble comonomer, and where the polymer nanoparticles are a copolymer of a monomer and the water-soluble comonomer. The mixture includes the initiator and may include water, a surfactant, or a water-soluble monomer, or any combinations thereof. The method includes heating the mixture in a preheating section of the continuous flow reactor. The preheating section may include an upstream portion of the flow channel for flow of the mixture. The method includes feeding monomer to the continuous flow reactor. The method includes mixing the monomer with the mixture in a reaction section of the continuous flow reactor downstream of the preheating section. The method includes polymerizing the monomer in presence of the radical initiator in the reaction section to form polymer nanoparticles, wherein polymerizing the monomer includes emulsion polymerization. The method includes discharging the polymer nanoparticles from the continuous flow reactor. The discharging of the polymer nanoparticles may involve discharging a slurry having the polymer nanoparticles in at least water from the continuous flow reactor. The polymer nanoparticles may be monodispersed polymer nanoparticles. In certain implementations, the continuous flow reactor is a microreactor. The flow channel of the continuous flow reactor may have a hydraulic diameter less than 1 mm.

The flow channel may run through the reaction section for mixing the monomer with the mixture (having the initiator) and for the emulsion polymerization of the monomer into the polymer nanoparticles. The mixing may include mixing the monomer with the mixture in an initial subsection (for example, a mixing section) of the reaction section. The feeding of the monomer may involve feeding a first monomer and a second monomer (for example, comonomer). The polymer nanoparticles may be a copolymer of the first monomer and the second monomer. The method may include polymerizing the monomer(s) in presence of the radical initiator via the emulsion polymerization in the continuous flow reactor to form the polymer nanoparticles, wherein the polymer nanoparticles have a particle size less than 100 nanometers (nm). The method may include forming the polymer nanoparticles from a polymerization mixture in the flow channel. The polymerization mixture has at least the monomer and the radical initiator. The polymerization mixture may include the surfactant to facilitate formation of the emulsion and the emulsion polymerization. The monomer may include a vinyl monomer (for example, an acrylate monomer), and where the polymer nanoparticles include a vinyl polymer (for example, an acrylate polymer). The monomer may include a first vinyl monomer (for example, an acrylate monomer) and a second vinyl monomer (for example, a styrenic monomer). The vinyl polymer may be a copolymer of the acrylate polymer and the styrenic monomer. The method may include controlling a weight or mole ratio of the styrenic monomer to the acrylate monomer to reduce agglomeration of the polymer nanoparticles. The method may include circulating a heat transfer fluid through a flow layer in the continuous flow reactor. The flow layer is adjacent the flow channel. The method may include circulating heat transfer fluid through a utility side of the continuous flow reactor to control temperature of the polymerization mixture in the flow channel (including in the reaction section and in the preheating section in implementations). The continuous flow reactor (for example, microreactor) may have a heat transfer area per unit volume of the flow channel of at least 5000 $m^2/m^3$.

Another embodiment is a method of flow synthesis of polymer nanoparticles, including preheating a mixture having a radical initiator in a continuous flow reactor having a flow channel. In some implementations, the flow channel has a width less than 1 millimeter (mm). The mixture may include water and a surfactant (for example, a sulfate). The method includes polymerizing monomer methacrylate units in presence of the initiator by an emulsion polymerization in the continuous flow reactor to form polymer nanoparticles including polymer of the methacrylate units. The method includes discharging the polymer nanoparticles from the continuous flow reactor. The monomer having the methacrylate units may be butyl methacrylate (BMA), and where the polymer of the methacrylate units is poly(butyl methacrylate) (PBMA). The monomer may be a monomer mixture of styrene and BMA, and where the polymer of the methacrylate units is the copolymer poly(styrene-co-butyl methacrylate) (PSBMA).

Yet another embodiment includes a method of flow synthesis of polymer nanoparticles, including flowing a first mixture having a radical initiator and water to a continuous flow reactor having a flow channel(s) for reactant flow. In some implementations, the first mixture includes a surfactant. The method may include preheating the first mixture in the continuous flow reactor. The method includes flowing monomer to the continuous flow reactor and forming in the continuous flow reactor a second mixture having the first mixture and the monomer. The forming of the second mixture may involve mixing the monomer with the first mixture in the continuous flow reactor. The method includes polymerizing, via emulsion polymerization, the monomer in the second mixture in the continuous flow reactor to form polymer nanoparticles. The flow channel(s) may be a microchannel having a hydraulic diameter less than 1 mm. The continuous flow reactor may be a microreactor. The method may include discharging a slurry from the continuous flow reactor. The slurry may include at least the polymer nanoparticles, water, and residual monomer. The discharged slurry may include the surfactant if employed in the polymerization.

A number of implementations have been described. Nevertheless, it will be understood that various modifications may be made without departing from the spirit and scope of the disclosure.

What is claimed is:

1. A method of flow synthesis of polymer nanoparticles, comprising:
    feeding a mixture comprising a radical initiator to a continuous flow reactor comprising a channel;
    heating the mixture in a preheating section of the continuous flow reactor;
    feeding monomer to the continuous flow reactor;
    mixing the monomer with the mixture in a reaction section of the continuous flow reactor downstream of the preheating section;
    polymerizing the monomer in presence of the radical initiator in the reaction section to form polymer nanoparticles, wherein polymerizing the monomer comprises emulsion polymerization; and
    discharging the polymer nanoparticles from the continuous flow reactor, wherein discharging the polymer nanoparticles comprises discharging a slurry from the continuous flow reactor, the slurry comprising the polymer nanoparticles and water, and wherein the polymer nanoparticles comprise a polydispersity index (PDI) less than 0.1.

2. The method of claim 1, wherein the channel comprises a flow channel in the reaction section for mixing the monomer with the mixture and for polymerization of the monomer into the polymer nanoparticles, and wherein the mixing comprises mixing the monomer with the mixture in an initial subsection of the reaction section.

3. The method of claim 2, wherein the channel comprises the flow channel in the preheating section for flow of the mixture, and wherein the initial subsection comprises a mixing section of the reaction section.

4. The method of claim 1, wherein the continuous flow reactor comprises a microreactor, wherein the channel comprises a microchannel having a hydraulic diameter less than 1 millimeter (mm), and wherein the mixture comprises water and a surfactant.

5. The method of claim 1, comprising feeding a surfactant to the continuous flow reactor, wherein the feeding monomer comprises feeding the monomer to enter the continuous flow reactor in the reaction section downstream of the preheating section.

6. The method of claim 1, wherein feeding the monomer comprises feeding a first monomer and a second monomer, wherein the second monomer is comonomer, and wherein the polymer nanoparticles comprise a copolymer of the first monomer and the second monomer.

7. The method of claim 1, comprising circulating a heat transfer fluid through a flow layer in the continuous flow reactor, wherein the flow layer is adjacent to the channel, and wherein the polymer nanoparticles comprise a particle size less than 100 nanometers (nm).

8. The method of claim 7, comprising forming the polymer nanoparticles from a polymerization mixture in the channel in the reaction section, the polymerization mixture comprising the monomer and the mixture, wherein the polymer nanoparticles comprise monodispersed polymer nanoparticles.

9. The method of claim 1, comprising:
    forming the polymer nanoparticles from a polymerization mixture in the channel in the reaction section, the polymerization mixture comprising the monomer and the radical initiator; and
    circulating heat transfer fluid through a utility side of the continuous flow reactor to control temperature of the polymerization mixture in the channel, wherein the continuous flow reactor comprises a heat transfer area per unit volume of the channel of at least 5000 square meters per cubic meter.

10. The method of claim 1, wherein the monomer comprises a vinyl monomer, and wherein the polymer nanoparticles comprise a vinyl polymer.

11. The method of claim 10, wherein the vinyl monomer comprises an acrylate monomer, and wherein the vinyl polymer comprises an acrylate polymer.

12. The method of claim 10, wherein the vinyl monomer comprises a first vinyl monomer and a second vinyl monomer.

13. The method of claim 12, wherein the first vinyl monomer comprises an acrylate monomer, wherein the second vinyl monomer comprises a styrenic monomer, and wherein the vinyl polymer comprises copolymer of the acrylate monomer and the styrenic monomer, and wherein the copolymer comprises acrylate polymer and styrenic polymer.

14. The method of claim 13, comprising controlling a weight ratio of the styrenic monomer to the acrylate monomer to reduce agglomeration of the polymer nanoparticles.

15. A method of flow synthesis of polymer nanoparticles, comprising:
preheating a mixture comprising a radical initiator in a continuous flow reactor having a flow channel;
polymerizing monomer comprising methacrylate units in presence of the initiator via an emulsion polymerization in the continuous flow reactor to form polymer nanoparticles comprising polymer of the methacrylate units; and
discharging the polymer nanoparticles from the continuous flow reactor, wherein discharging the polymer nanoparticles comprises discharging a slurry from the continuous flow reactor, the slurry comprising the polymer nanoparticles and water, and wherein the polymer nanoparticles comprise a polydispersity index (PDI) less than 0.1.

16. The method of claim 15, wherein the monomer comprising the methacrylate units comprises butyl methacrylate (BMA), and wherein the polymer of the methacrylate units comprises poly(butyl methacrylate) (PBMA).

17. The method of claim 15, wherein the monomer comprises a monomer mixture of styrene and BMA, and wherein the polymer of the methacrylate units comprise a copolymer comprising poly(styrene-co-butyl methacrylate) (PSBMA).

18. The method of claim 15, wherein the mixture comprises water and a surfactant comprising a sulfate, and wherein the flow channel comprises a width less than 1 millimeter (mm).

19. A method of flow synthesis of polymer nanoparticles, comprising:
flowing a first mixture comprising a radical initiator and water to a continuous flow reactor having a flow channel for reactant flow;
flowing monomer to the continuous flow reactor;
forming in the continuous flow reactor a second mixture comprising the first mixture and the monomer;
polymerizing, via emulsion polymerization, the monomer in the second mixture in the continuous flow reactor to form polymer nanoparticles; and
discharging a slurry from the continuous flow reactor, the slurry comprising the polymer nanoparticles, water, and residual monomer, wherein the polymer nanoparticles comprise polymer from acrylamide or acrylic acid, wherein the polymer nanoparticles comprise a polydispersity index (PDI) less than 0.1.

20. The method of claim 19, wherein the flow channel comprises a microchannel comprising a hydraulic diameter less than 1 millimeter (mm), and wherein the continuous flow reactor comprises a microreactor.

21. The method of claim 19, wherein forming the second mixture comprises mixing the monomer with the first mixture in the continuous flow reactor, and wherein the monomer is not preheated in the continuous flow reactor prior to mixing of the monomer with the first mixture to form the second mixture.

22. The method of claim 19, wherein the first mixture comprises a surfactant, and wherein the slurry comprises the surfactant.

23. A continuous flow reactor system comprising:
a first source to supply a mixture to a continuous flow reactor comprising a flow channel, the mixture comprising a radical initiator and water;
a second source to supply monomer to the continuous flow reactor; and
the continuous flow reactor comprising:
a preheater section to heat the mixture;
a mixing section to mix the monomer with the mixture to form a polymerization mixture for emulsion polymerization in the flow channel; and
a reaction section to polymerize, via the emulsion polymerization, the monomer in the polymerization mixture to form polymer nanoparticles in the flow channel, wherein the first source to supply the mixture to the preheater section, and wherein the second source to supply the monomer to enter the continuous flow reactor at the reaction section downstream of the preheater section, wherein the preheater section, the mixing section, and the reaction section comprise the flow channel, and wherein the mixing section comprises an initial subsection of the reaction section.

24. The system of claim 23, wherein the first source comprises a motive device to supply the mixture to the continuous flow reactor, and wherein the first source comprises a control component to modulate flow rate of the mixture to the continuous flow reactor.

25. The system of claim 24, wherein the motive device comprises a pump.

26. The system of claim 25, wherein the pump comprises the control component.

27. The system of claim 23, wherein the second source comprises a control component to modulate flow rate of the monomer to the continuous flow reactor.

28. The system of claim 23, wherein the second source comprises a motive device to supply the monomer to the continuous flow reactor.

29. The system of claim 23, wherein the mixture comprises a surfactant, and wherein the first source comprises a mixer to combine the initiator, the surfactant, and the water into a solution comprising the mixture.

30. The system of claim 23, wherein the continuous flow reactor comprises a microreactor, wherein the flow channel comprises a microchannel having a hydraulic diameter less than 1 millimeter (mm).

31. The system of claim 23, comprising a heat-transfer fluid system comprising a motive device and a heat exchanger to circulate heat transfer fluid through a utility side of the flow channel.

* * * * *